(12) United States Patent
Takenoshita et al.

(10) Patent No.: US 7,841,554 B2
(45) Date of Patent: *Nov. 30, 2010

(54) RECORDING TAPE CARTRIDGE

(75) Inventors: Kenji Takenoshita, Kanagawa (JP);
Kazuo Hiraguchi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/510,264

(22) Filed: Jul. 28, 2009

(65) Prior Publication Data

US 2010/0038466 A1    Feb. 18, 2010

(30) Foreign Application Priority Data

Aug. 13, 2008    (JP)    ............................. 2008-208405

(51) Int. Cl.
*G03B 23/02*    (2006.01)

(52) U.S. Cl. ...................... 242/338.1; 242/348; 360/132

(58) Field of Classification Search .................. 242/338, 242/338.1, 343, 343.2, 348, 348.2; 360/132
See application file for complete search history.

(56) References Cited

U.S. PATENT DOCUMENTS

| | | | |
|---|---|---|---|
| 5,004,180 A | 4/1991 | Okamura et al. | |
| 5,436,782 A * | 7/1995 | Sieben | ........................ 360/132 |
| 6,318,657 B1 | 11/2001 | Nayak | |
| 6,751,059 B2 | 6/2004 | Morita et al. | |
| 6,913,217 B2 | 7/2005 | Ishihara | |
| 7,040,564 B1 | 5/2006 | Veno et al. | |
| 7,104,486 B2 * | 9/2006 | Hiraguchi | ................ 242/338.1 |
| 7,322,540 B2 * | 1/2008 | Hiraguchi | ................ 242/338.1 |
| 7,530,518 B2 * | 5/2009 | Hiraguchi | ................ 242/338.1 |
| 2005/0051654 A1 | 3/2005 | Hiraguchi | |
| 2006/0231659 A1 | 10/2006 | Hiraguchi | |

FOREIGN PATENT DOCUMENTS

| | | |
|---|---|---|
| EP | 1895534 | 3/2008 |
| JP | 2005-196938 A | 7/2005 |
| JP | 2006-012384 A | 1/2006 |

OTHER PUBLICATIONS

Corresponding EPO Official Communication.
US Office Action of Mar. 17, 2006 issued for corresponding US Patent No. 7,322,540.

* cited by examiner

*Primary Examiner*—William A Rivera
(74) *Attorney, Agent, or Firm*—Solaris Intellectual Property Group, PLLC

(57) ABSTRACT

A recording tape cartridge can prevent release of rotation locking of a reel with respect to a case accompanying dropping of the recording tape cartridge. The tape recording cartridge is configured to rotatably accommodate within a case a reel that has magnetic tape wound on a reel hub. Within the reel hub, external teeth of a brake gear, of a brake member that is supported so as to be non-rotatable with respect to the case, mesh with an engaged gear having internal teeth, preventing rotation of the reel with respect to the case. Lock portions of lock members are inserted between the reel positioned biased to a bottom panel side by a compression coil spring, and a top panel, thereby preventing movement of the reel with respect to the case in the reel axial direction.

11 Claims, 17 Drawing Sheets

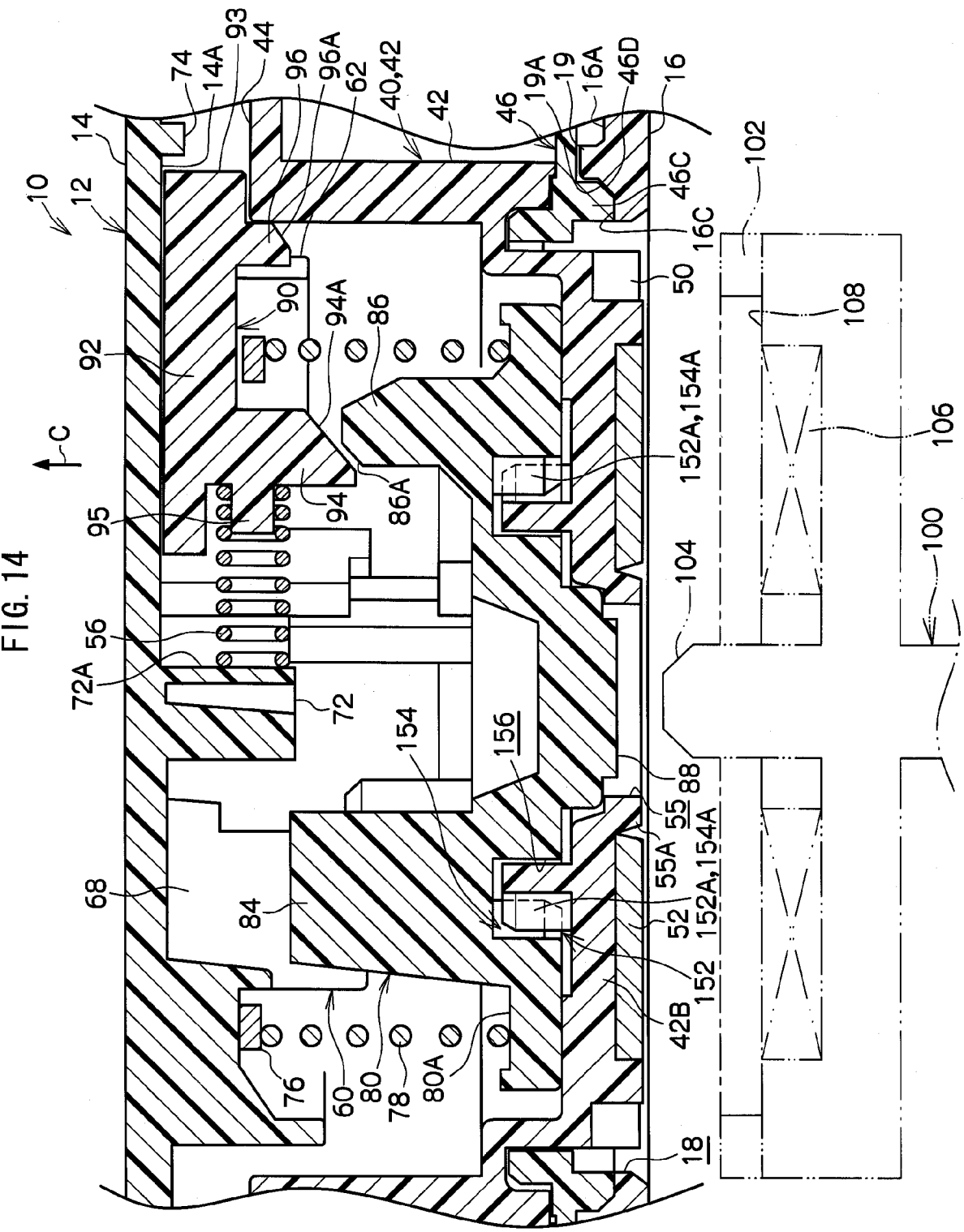

RECORDING TAPE CARTRIDGE

CROSS-REFERENCE TO RELATED APPLICATION

This application claims priority under 35 USC 119 from Japanese Patent Application No. 2008-208405, filed on Aug. 13, 2008, the disclosure of which is incorporated by reference herein.

BACKGROUND

1. Technical Field

The present invention relates to a recording tape cartridge that rotatably accommodates within a case a reel on which recording tape is wound, such as magnetic tape or the like.

2. Related Art

Recording tape cartridges are known that lock rotation of a reel relative to a case by meshing a brake gear, formed at the outer periphery of a brake member that is not rotatable with respect to the case, with an engaged gear formed at the inner periphery of the reel hub. Recording tape cartridges are also known that, by introducing a lock member between a reel and a case top panel, restrict displacement of the reel in with respect to the case in the reel axial direction.

However, when a recording tape cartridge is dropped, such as onto the floor, sometimes the impact therefrom displaces the reel such that it is tilted with respect to the case. In such cases a brake member that is only restricted in displacement with respect to the case in the up-down direction (usually the reel axial direction) is not substantially tilted relative to the case and so becomes relatively tilted with respect to the reel.

However, there is concern in conventional technology, like that described above, that the rotationally locked state of the reel, by the brake member, is released due to a relative change in the attitude (tilting) of the brake member with respect to the reel when dropped, and there is room for improvement in this respect.

SUMMARY

The present invention is made in consideration of the above circumstances and provides a recording tape cartridge that can prevent release of the rotationally locked state of the reel with respect to the case when the recording tape cartridge is dropped.

A recording tape cartridge according to the present invention includes a reel that has recording tape wound on the outer periphery of a circular cylindrical shaped hub; an engaged gear having a plurality of teeth disposed inside the hub around a circular circumference coaxial to the reel hub, with each of the teeth configured with a meshing face substantially parallel to the reel axis; a case having a top panel and a bottom panel that face each other, with the reel accommodated between the top panel and the bottom panel and movable along the axial direction; a brake member having a brake gear supported so as to be non-rotatable with respect to the case and so as to be meshable, at a meshing face substantially parallel to the reel axial direction, with the meshing face of the engaged gear, the brake member, by displacing with respect to the hub in the reel axial direction, adopting a rotation locking position in which the brake gear is meshed with the engaged gear, and a rotation permitting position in which the meshing is released; a guide member that restricts a displacement direction of the brake member with respect to the case to the reel axial direction; a first biasing member that biases the reel toward the bottom panel side and generates biasing force to bias the brake member to the rotation locking position; a plurality of lock members that are provided around the hub circumferential direction, the plurality of lock members adopting a restricting position that restricts movement of the reel in the axial direction by being inserted between an end portion at the top panel side of the reel and the top panel when the reel is in a state positioned biased to the bottom panel side, and the plurality of lock members adopting a restriction released position that permits movement of the reel with respect to the case in the axial direction by retreating from the restricting position; a second biasing member that biases the lock members toward the restricting position; and a lock release mechanism that has a pressed portion provided to the plurality of lock members and a pressing portion provided to the brake member, the lock release mechanism moving the plurality of lock members from the restricting position to the restriction released position by the pressing portion pressing the pressed portion accompanying the movement of the brake member from the rotation locking position to the rotation permitting position.

BRIEF DESCRIPTION OF THE DRAWINGS

Exemplary embodiments of the present invention will be described in detail based on the following figures, wherein:

FIG. 14 is a lateral cross-section showing an enlargement of a recording tape cartridge according to a second exemplary embodiment of the present invention, in a not-in-use state.

DETAILED DESCRIPTION

Explanation will now be given of a recording tape cartridge 10 according to a first exemplary embodiment of the present invention, with reference to FIG. 1 to FIG. 11. For ease of explanation, the direction of loading a recording tape cartridge 10 into a drive device (the direction shown in FIG. 1 etc. by the arrow A) is designated as the front direction; and the directions shown respectively by the arrow B and by arrow C, which are orthogonal to the direction of arrow A, are designated respectively as the left direction and the up direction.

(Overall Configuration of Recording Tape Cartridge)

Figure 1:
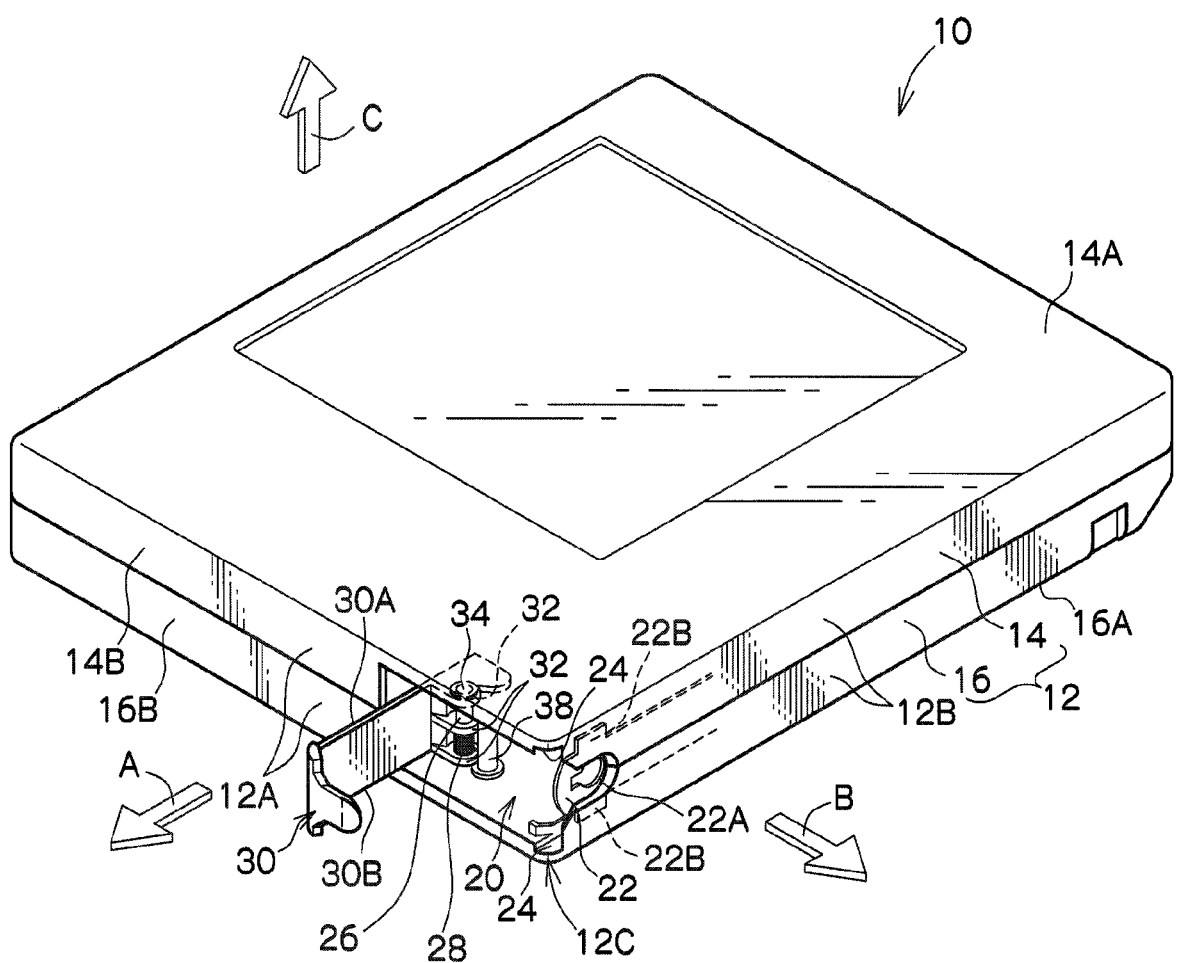
FIG. 1 is a schematic perspective view of a recording tape cartridge according to a first exemplary embodiment of the present invention.
Figure 2:
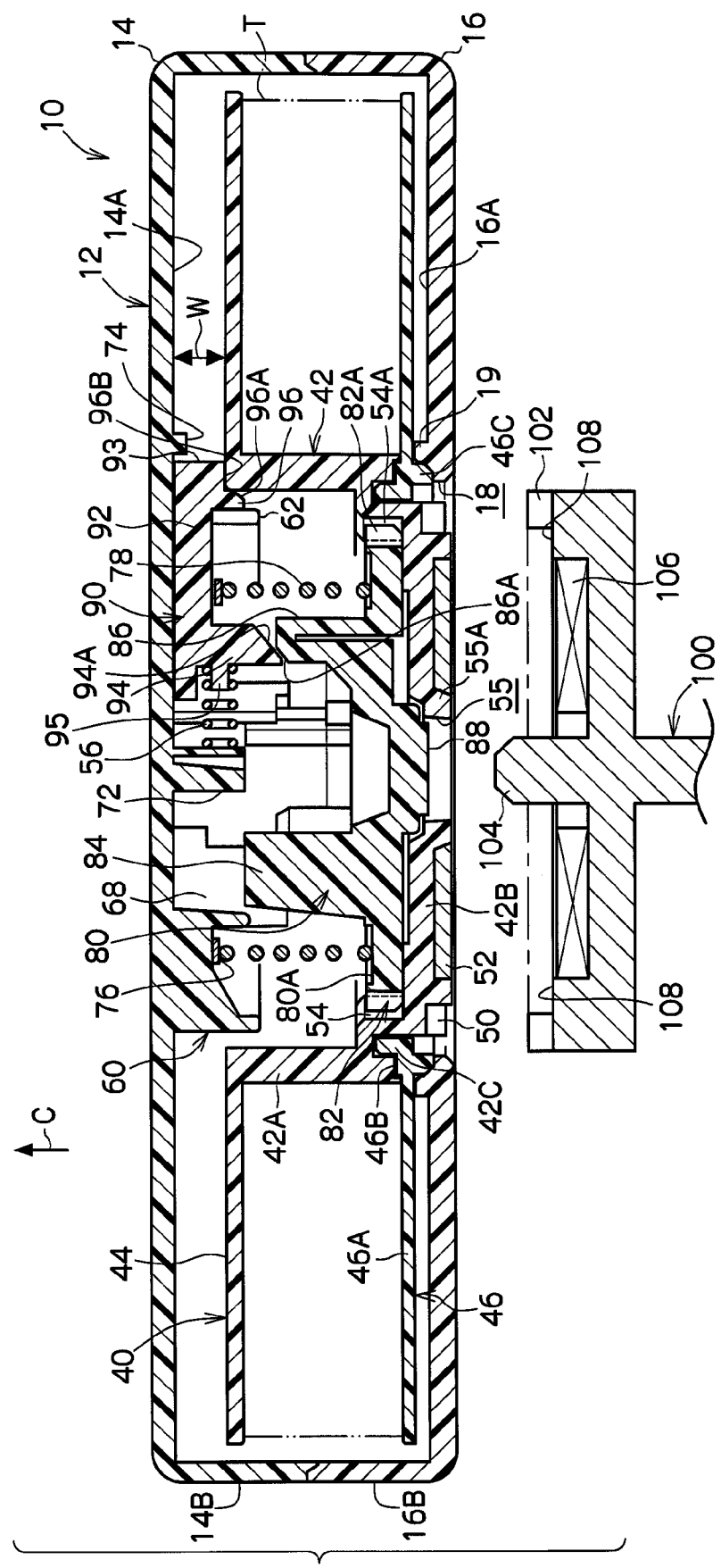
FIG. 2 is a lateral cross-section of a recording tape cartridge according to the first exemplary embodiment of the present invention, in a not-in-use state.
Figure 3:
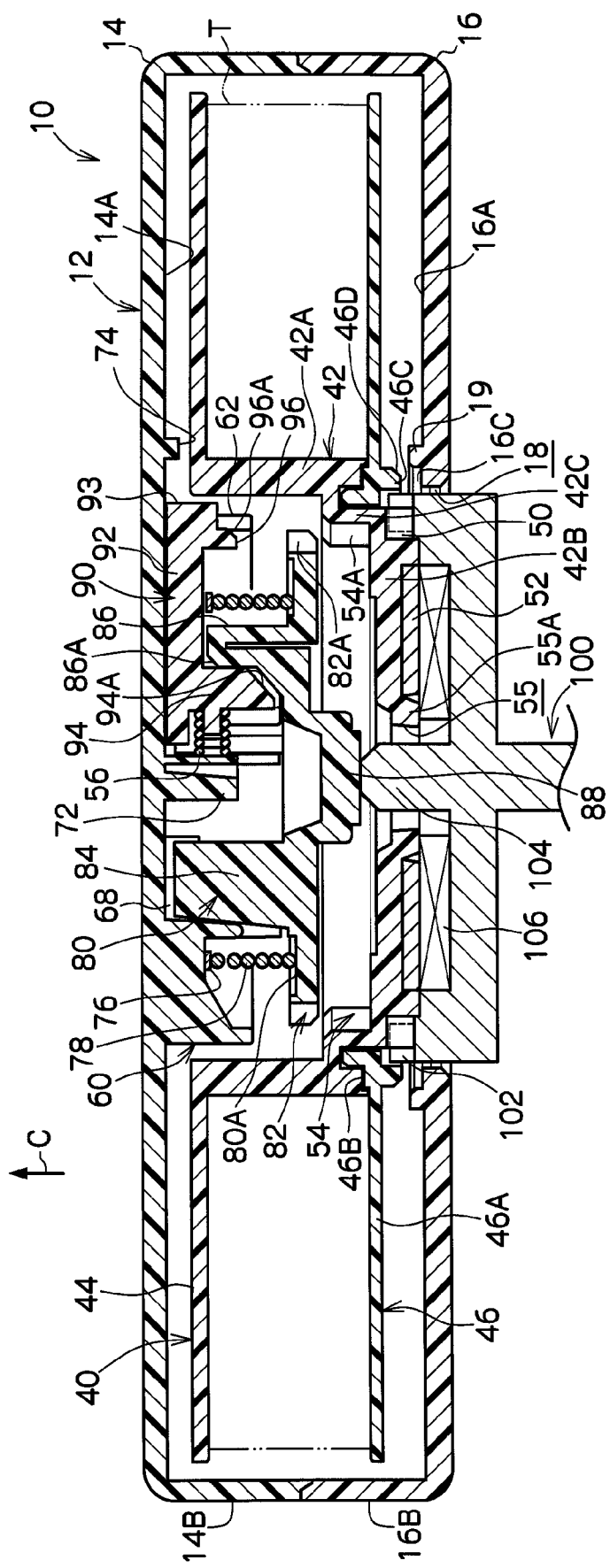
FIG. 3 is a lateral cross-section of reel-rotation state of a recording tape cartridge according to the first exemplary embodiment of the present exemplary embodiment.

An external view of the recording tape cartridge 10 is shown as a perspective view in FIG. 1. FIG. 2 and FIG. 3 are cross-sections showing the recording tape cartridge 10 respectively when not in use and when in use. As shown in these drawings, the recording tape cartridge 10 is equipped with a case 12. The case 12 is configured with an upper case 14 and a lower case 16, joined together.

Specifically, the upper case 14 is configured with a substantially frame shaped peripheral wall 14B projecting down along the outer edges of a top panel 14A that is of substantially rectangular shape in plan view, and the lower case 16 is configured with a peripheral wall 16B projecting up along the outer edges of a bottom panel 16A that is formed in a shape substantially corresponding to that of the top panel 14A. The case 12 forms substantially a box shape, with the upper case 14 and the lower case 16 joined together by ultrasonic welding, screw fasteners or the like in a state in which the open end of the peripheral wall 14B and the open end of the peripheral wall 16B abut each other.

As shown in FIG. 2, a rotatable reel 40, described in detail below, is rotatably accommodated within the case 12. Only a single one of the reel 40 is provided. Magnetic tape T, serving as recording tape, is wound around the reel 40, and a leader tape 22, serving as a leader member, is provided to the leading end of the magnetic tape T. A gear opening 18 is also provided in the bottom panel 16A of the case 12, in order to externally expose the reel 40 for rotational driving. The structure around the gear opening 18 will be described later, along with the reel 40.

An opening 20, for pulling the magnetic tape T wound on the reel 40 out from, is formed in the vicinity of a corner portion 12C at the left-front side of the case 12, at the boundary portion of a front wall 12A (the wall of the case 12, configured from the peripheral wall 14B and the peripheral wall 16B, facing toward the front) and a left side wall 12B (the wall of the case 12, configured from the peripheral wall 14B and the peripheral wall 16B, facing toward the left) of the case 12. The opening 20 is formed straddling both the front wall 12A and the left side wall 12B adjacent to the corner portion 12C. The recording tape cartridge 10 is configured such that the leader tape 22, fixed to the leading end of the magnetic tape T and disposed along the left side wall 12B, is pulled out from the opening 20.

The leader tape 22 is a member that is pulled out, and is engaged by a pulling out member of a drive device (not illustrated in the drawings) in order to pull out the magnetic tape T. The leader tape 22 is a tape shaped member of substantially the same width as the magnetic tape T and with greater strength than the magnetic tape T. A hole 22A is pierced through in the vicinity of the leading end of the leader tape 22, the pulling out member engaging the hole 22A. Extending portions 22B are formed extending out respectively to both sides in the width direction (upward and downward) at the top and bottom sides slightly further to the rear than the leading end of the hole 22A.

Figure 8:
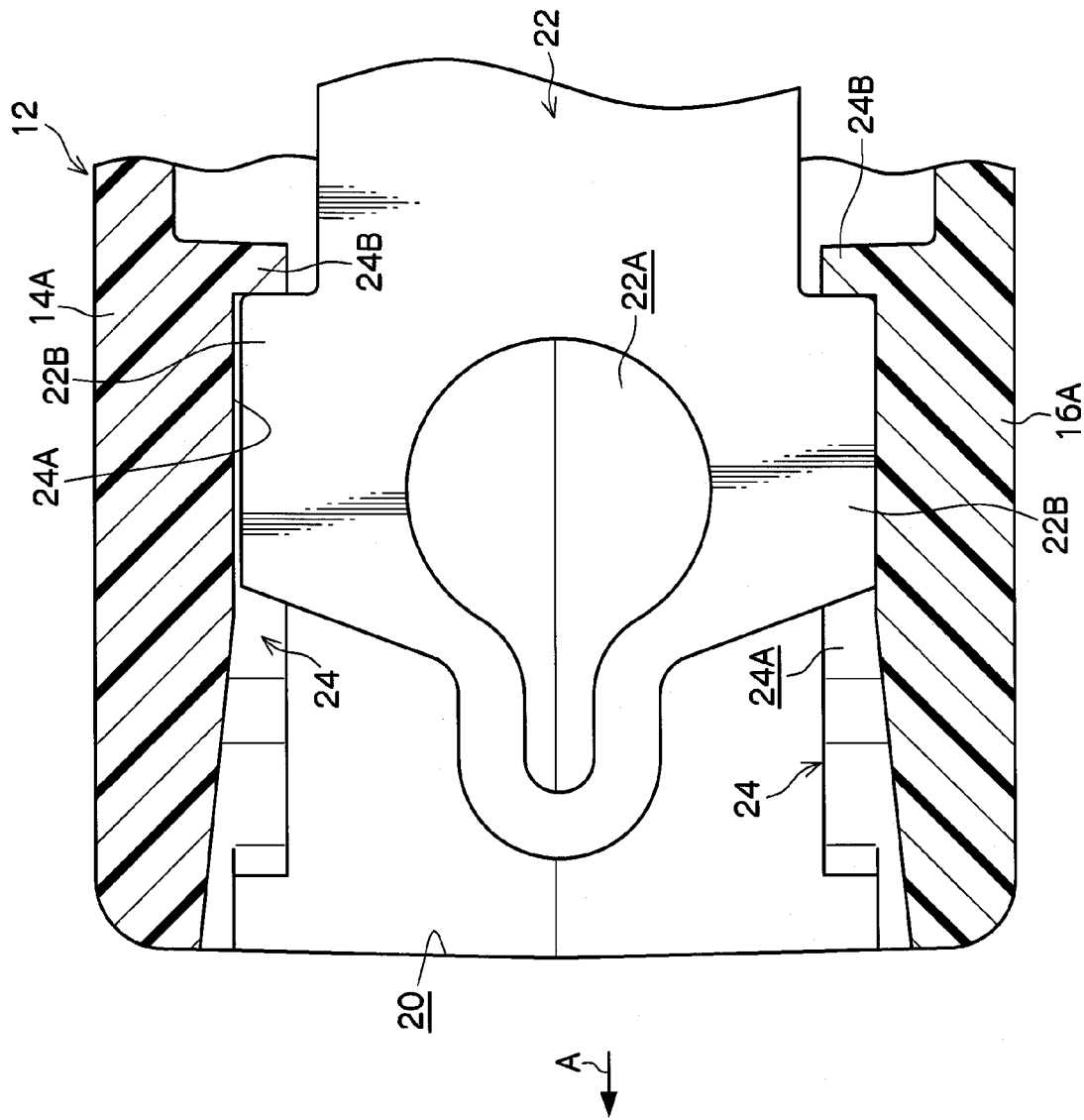
FIG. 8 is a lateral cross-section showing a leader tape configuring a recording tape cartridge according to the first exemplary embodiment of the present exemplary embodiment, in a retained state with respect to a case.

Configuration is made such that the leader tape 22 is retained within the case 12 by the extending portions 22B being housed (inserted) into slots 24, serving as slot portions, formed respectively in the inside face of the upper case 14 and the inside face of the lower case 16. As shown in FIG. 8, the slots 24 each have a groove 24A that is long in the front-rear direction and is open toward the front, and a stopper wall 24B, serving as a stopper portion, for restricting further movement of the extending portions 22B housed in the groove 24A toward the inside of the case (toward the rear).

The opening 20 is blocked off by a door 30 when the recording tape cartridge 10 is not in use. The door 30 is formed in substantially an L-shape in plan view, and is substantially the same shape and size as the opening 20. Note that while the door 30 is preferably formed from an olefin resin, such as POM (polyacetal) or the like, the door 30 may also be formed from a resin such as PC (polycarbonate) or the like, or from a metal, such as SUS (stainless steel) or the like. The door 30 opens or closes off the opening 20 by rotational movement about a rotational axis of support shafts 26 that project from the front wall 12A side of the upper case 14 and the lower case 16, respectively.

Three parallel rotational sliding portions 32 of flat plate shape project from the inside face of the door 30 in the vicinity of the right end of the door 30 (at locations shifted a specific distance toward the left from the right end thereof). The rotational sliding portions 32 project respectively from portions at both top and bottom edges of the inside face of the door 30 and from an intermediate portion thereof slightly lower than the center. Through holes are pierced through each of the rotational sliding portions 32 into which the support shafts 26 fit. Consequently the door 30 is rotatably supported by the support shafts 26 passing through each of the through holes.

Ring shaped protrusions 34 are formed on the top face of the rotational sliding portion 32 at the top end portion and on the bottom face of the rotational sliding portion 32 at the bottom end portion, around the respective through holes. By contact of the ring shaped protrusions 34 with the top panel 14A and the bottom panel 16A respectively, a gap of about 0.3 mm to 0.5 mm formed respectively between a top edge face 30A of the door 30 and the top panel 14A, and between a bottom edge face 30B of the door 30 and the bottom panel 16A. The sliding resistance between the case 12 and the door 30 is thereby reduced. The door 30 is configured to rotate in the direction to open the opening 20 by an opening and closing member of the drive device pressing against a portion further to the right side of the door 30 than the support shafts 26.

A wound portion of a torsion spring 28 fits over the support shaft 26 and constantly biases the door 30 in the direction to block off the opening 20. Namely, the wound portion of the torsion spring 28 is attached so as to fit over the support shaft 26 between the rotational sliding portion 32 at the bottom end portion and the rotational sliding portion 32 at the intermediate portion. A portion at one end side of the torsion spring 28 is also latched to a screw boss 38 of the case 12 (a screw boss projecting from the lower case 16), and a portion at the other end side of the torsion spring 28 is latched to a portion to the right side of the door 30 with respect to the rotational sliding portions 32.

The door 30 thereby blocks off the opening 20 due to biasing force from the torsion spring 28 when the recording tape cartridge 10 is not in use, and when the portion further to the right side than the support shafts 26 is pressed by the opening and closing member during loading operation of the recording tape cartridge 10 into the drive device, the door 30 is rotated against biasing force of the torsion spring 28 so as to open the opening 20.

(Configuration of the Reel etc.)

Figure 7:
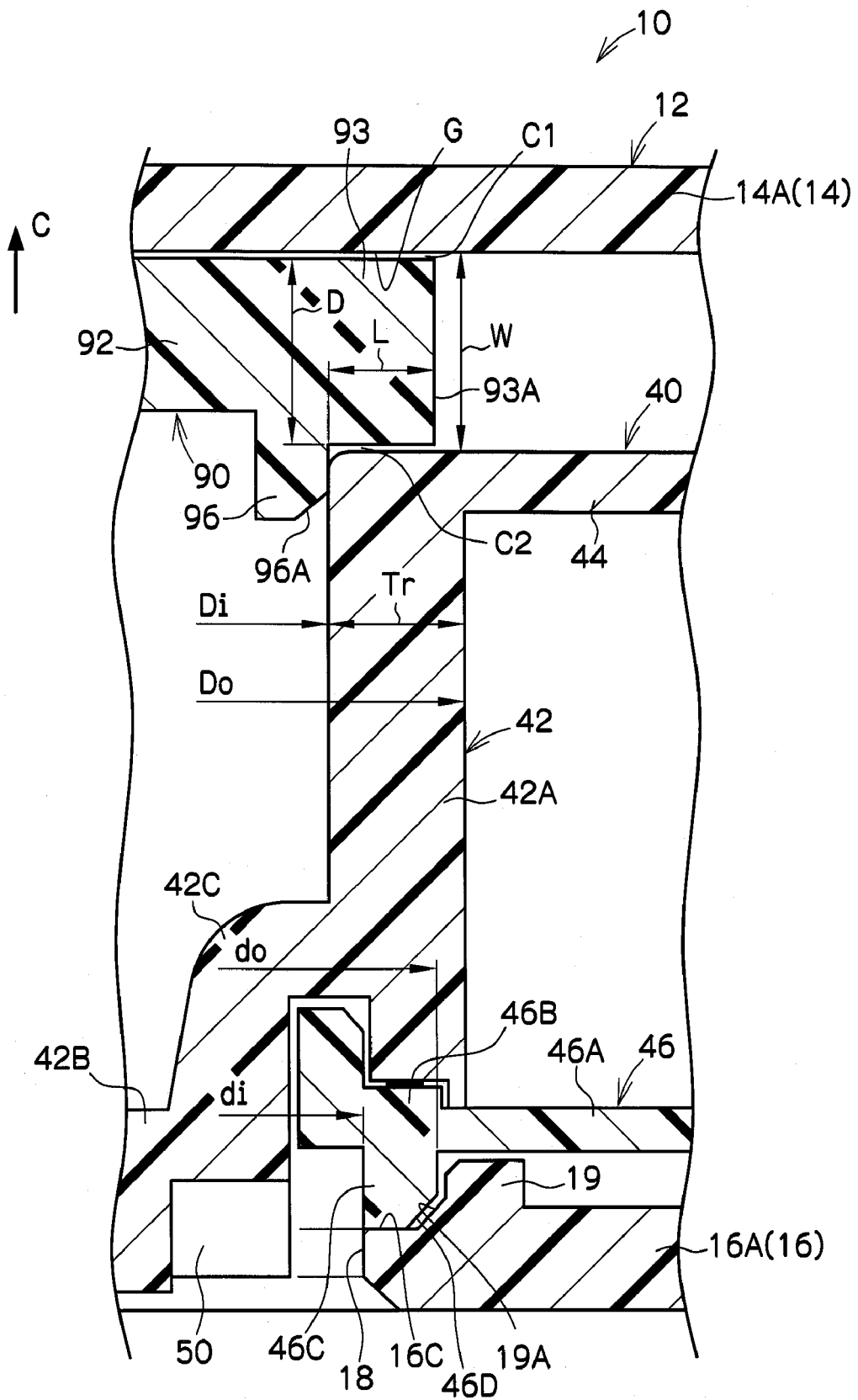
FIG. 7 is a cross-section showing an enlargement of a reel configuring a recording tape cartridge according to the first exemplary embodiment of the present exemplary embodiment, in a movement restricted state in the axial direction.

Explanation will now be given of the reel 40. As shown in FIG. 7, the reel 40 is equipped with a reel hub 42 configuring an axial center portion of the reel 40. The reel hub 42 is equipped with a circular cylindrical portion 42A, serving as the "hub" of the present invention, with magnetic tape T wound on the outer periphery thereof. The reel hub 42 is equipped with a substantially circular plate shaped bottom plate portion 42B and with an inner circular cylindrical portion 42C, of substantially circular short cylindrical shape, connecting together the outer peripheral portion of the bottom plate portion 42B with the bottom inner peripheral portion of the circular cylindrical portion 42A. A gap is formed between the inner circular cylindrical portion 42C and a portion in the vicinity of the bottom end of the circular cylindrical portion 42A. The bottom plate portion 42B is positioned so as to project further downward than the bottom end of the circular cylindrical portion 42A.

A top flange 44 is coaxially and integrally formed extending out toward the radial direction outside from the open end (top end) of the circular cylindrical portion 42A of the reel hub 42. The reel hub 42 is configured with a high strength (rigidity) against winding tension etc. of the magnetic tape T due to the top flange 44 being formed integrally to the open end side of the reel hub 42. In the present exemplary embodiment the top end face of the circular cylindrical portion 42A and the top face of the top flange 44 are in the same plane.

A portion at the bottom end of the circular cylindrical portion 42A is joined to a bottom flange member 46 by ultrasonic welding or the like. The bottom flange member 46 is formed from mutually coaxial components of: a bottom flange 46A corresponding to the top flange 44; a welding portion 46B positioned at the radial direction inside of the bottom flange 46A and welded to the bottom end of the circular cylindrical portion 42A of the reel hub 42; and a ring shaped rib 46C that projects, from the bottom side of the welding portion 46B, further downward than the bottom face of the bottom flange 46A.

As shown in FIG. 7, the ring shaped rib 46C has an internal diameter $d_i$ that is greater than the internal diameter $D_i$ of the circular cylindrical portion 42A, and has an external diameter $d_o$ that is smaller than the external diameter $D_o$ of the circular cylindrical portion 42A. Namely, when the bottom flange member 46 at the welding portion 46B is in a welded state to the bottom end face of the circular cylindrical portion 42A, the ring shaped rib 46C is positioned within a range along the radial direction thickness Tr $(=(D_o-D_i)/2)$ of the circular cylindrical portion 42A. The outer peripheral portion of the bottom end of the ring shaped rib 46C is formed as a tapered face 46D, with the external diameter of the tapered face 46D being even smaller than do.

A reel gear 50 is formed to the bottom face (outer face) of the bottom plate portion 42B of the reel hub 42, reel gear 50 being formed coaxial to the bottom plate portion 42B in a ring shape. The reel gear 50 is meshable with a drive gear 102 provided to a rotation shaft 100 of the drive device by relative movement in the axial direction. A reference projection 48 having a reference surface 48A as the bottom end face thereof is provided projecting from the bottom face of the bottom plate portion 42B at the inside of the reel gear 50. The reference projection 48 is a ring shape coaxial to the reel 40 and is integrally formed contiguous to the radial direction inside edge of the reel gear 50. The reference surface 48A of the reference projection 48 makes contact with a positioning surface 108 of the rotation shaft 100 so as to perform positioning of the reel 40 in the axial direction relative to the drive device.

An engaged gear 54 is provided at an inner portion of the reel hub 42, the engaged gear 54 being meshable with a brake gear 82 of the brake member 80, described below. The engaged gear 54 is formed in a ring shape straddling the bottom plate portion 42B and the inner circular cylindrical portion 42C, coaxial to the reel hub 42. The engaged gear 54 is formed as an internal toothed gear capable of meshing with the brake gear 82 and capable of being released from meshing with the brake gear 82, by relative movement in the axial direction. The shape of internal teeth 54A configuring the engaged gear 54 will be described below, along with the external teeth 82A of the brake gear 82.

A through hole 55 is provided at a portion at the axial center of the bottom plate portion 42B. The through hole 55 is for operation of the brake member 80 from outside, and in the present exemplary embodiment the through hole 55 is also configured to exhibit a centering function when the reel 40 is rotationally driven by a release projection 104 of the rotation shaft 100 fitting into the through hole 55. A boss portion 55A therefore projects downward from the bottom plate portion 42B at an edge portion of the through hole 55, a configuration that ensures a fitting length with the release projection 104. The bottom end face of the boss portion 55A is substantially in the same position as the reference surface 48A.

The reel 40 explained above is resin molded in one piece except for the bottom flange member 46. A reel plate 52 is coaxially attached to the bottom face of the bottom plate portion 42B between the reference projection 48 and the boss portion 55A, the reel plate 52 being formed from a magnetic material in a circular plate shape with a hole opened therein. The reel plate 52 is fixed to the bottom plate portion 42B by insert molding or crimping. The reel plate 52 is positioned further up than the reference surface 48A. The reel plate 52 is attracted and held in a non-contact manner by magnetic force of a magnet 106 of the rotation shaft 100.

The reel 40 as explained above, as shown in FIG. 2, is accommodated in the case 12, with the reel gear 50, the reference surface 48A, the reel plate 52 etc. externally exposed through the gear opening 18 when not in use. Specific explanation is given below.

The internal diameter of the gear opening 18 of the case 12 substantially matches the internal diameter of the ring shaped rib 46C, and is greater than the external diameter of the bottom plate portion 42B of the reel 40. When the reel 40 is not in use the bottom end face of the ring shaped rib 46C abuts the internal face (top face) of the bottom panel 16A around the gear opening 18, with the bottom plate portion 42B inserted within the gear opening 18. Namely, when not in use the reel 40 is positioned biased toward the bottom panel 16A side of the case 12. The position of the reel 40 at such a time will be referred to as the lowest position. It should be noted that in the recording tape cartridge 10 the dimensions of each portion are determined such that when the reel 40 is in the lowest position, each portion of the reel 40 does not project further downward than the outer face (bottom face) of the bottom panel 16A.

In the state in which the reel 40 is positioned in the lowest position a gap G (see FIG. 7) is formed between the top panel 14A and the top end face of the circular cylindrical portion 42A configuring the top end of the reel 40 (the top face of the top flange 44), with the gap G having a separation distance W along the reel 40 axial direction. When the reel 40 is rotationally driven by the rotation shaft 100, the reel 40 is raised within the case 12, as shown in FIG. 3, so as to rotate without contact with any portion of the case 12. The position of the reel 40 in this state will be referred to as the raised position.

A ring shaped rib 19 projects from the inside face of the bottom panel 16A at the radial direction outside of the gear opening 18 and coaxially to the gear opening 18. The internal diameter of the ring shaped rib 19 is slightly greater than the external diameter of the ring shaped rib 46C, and the projection height from the bottom panel 16A is slightly less than the projection height of the ring shaped rib 46C from the bottom flange 46A. The foot portion at the inside face of the ring shaped rib 19 is a tapered surface 19A that substantially corresponds to the tapered face 46D of the ring shaped rib 46C. The ring shaped location of the inside face of the bottom panel 16A further to the radial direction inside than the ring shaped rib 19 (the tapered surface 19A thereof), namely the ring shaped location that makes contact with the bottom end face of the ring shaped rib 46C when not in use, is referred to below as contact surface 16C.

The ring shaped rib 19 is configured such that when the reel 40 is positioned in the lowest position (when the bottom end face of the ring shaped rib 46C contacts the contact surface 16C), and the reel 40 is in the centered state, neither the internal face of the ring shaped rib 19 including the tapered surface 19A nor the top end face of the ring shaped rib 19 are in contact with the any portion of the reel 40. The ring shaped rib 19 is also configured such that if the reel 40 attempts to move off center it interferes with the ring shaped rib 46C thereby preventing this movement off center. The tapered face 46D of the reel 40 also exhibits a guiding-in function when the reel 40 returns to the lowest position from the raised position, guiding the reel 40 toward the inside of the ring shaped rib 19.

(Configuration of the Reel Lock Mechanism)

When not in use, the reel 40 as explained above is prevented from rotating with respect to the case 12 by the brake gear 82 of the brake member 80 meshing with the engaged gear 54 formed to the reel hub 42. Specific explanation will now be given.

Figure 4:
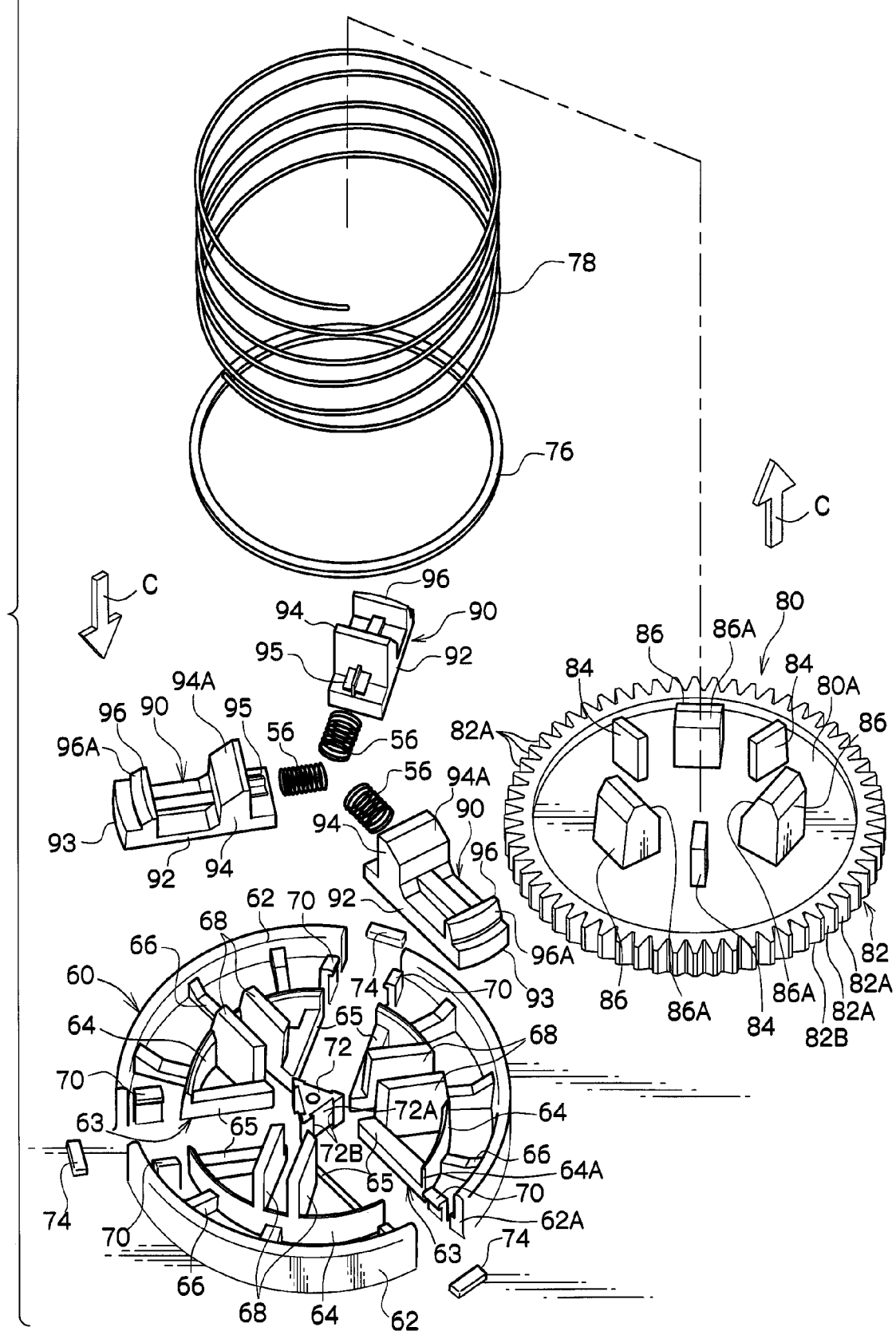
FIG. 4 is an explode perspective view of a reel lock mechanism configuring a recording tape cartridge according to the first exemplary embodiment.

The recording tape cartridge 10, as shown in FIG. 2 to FIG. 4, is equipped with a brake member 80 for preventing rotation of the reel 40 with respect to the case 12. The brake member 80 is formed in a substantially circular plate shape, with the brake gear 82, serving as a brake gear, formed to an outer peripheral portion of the brake member 80 and meshable with the engaged gear 54. The brake member 80 is inserted substantially coaxially into the circular cylindrical portion 42A of the reel hub 42, and is movable in the up-down direction (axial direction).

Plural (three in the present exemplary embodiment) guide lugs 84 project from the top face of the brake member 80 in a radial shape in plan view. The brake member 80 is supported in a non-rotatable state with respect to the case 12 by each of the brake gears 84 being inserted between guide wall portions 68, explained below, of the case 12. Each of the guide lugs 84 is guided in the up-down direction by the guide wall portions 68. Namely, the brake member 80 is configured such that relative displacement thereof with respect to the case 12 is only permitted in the up-down direction (the reel 40 axial direction), due to the respective plural guide lugs 84 and the guide wall portions 68. The plural guide lugs 84 and guide wall portions 68 correspond to the guide member of the present invention.

The brake member 80 is able to adopt a rotation locking position (see FIG. 2) in which the brake gear 82 meshes with the engaged gear 54 and rotation of the reel 40 with respect to the case 12 is prevented, and, by movement up from the rotation locking position, a rotation permitting position (see FIG. 3) in which meshing of the brake gear 82 with the engaged gear 54 is released and the reel 40 is permitted to rotate with respect to the case 12.

Specifically, a compression coil spring 78, serving as a first biasing member, is disposed in a compressed state between the top panel 14A (a ring shaped stopper fitting 76 thereof, described below) of the case 12 and a spring receiving face 80A on the top face of the brake member 80 at the outside of the guide lugs 84. The brake member 80 is constantly biased toward the rotation locking position side by biasing force of the compression coil spring 78. The reel 40 is positioned biased to the lowest position due to biasing force of the compression coil spring 78 transmitted to the bottom plate portion 42B via the brake member 80. Consequently, in the present exemplary embodiment, in the rotation locking position of the brake member 80, the brake gear 82 is positioned in the axial direction meshing with the engaged gear 54 of the reel 40 that is positioned biased to the lowest position.

An operation projections 88 projects from a portion at the axial center of the bottom face of the brake member 80, and the operation projections 88 is inserted within the through hole 55 of the reel 40 in the state in which the brake member 80 is positioned in the rotation locking position. The brake member 80 is configured to move to the rotation permitting position from the rotation locking position by the operation projection 88 being pressed by the release projection 104 of the rotation shaft 100.

More specifically, accompanying the action of the rotation shaft 100 approaching the reel 40 along the axial direction, in order to mesh the drive gear 102 with the reel gear 50, the release projection 104 that projects further upward than the drive gear 102 from a portion at the axial center of the rotation shaft 100 presses the operation projection 88, such that the brake member 80 is moved against biasing force of the compression coil spring 78 to the rotation permitting position. The rotation shaft 100 moves the reel 40 to the raised position against biasing force of the compression coil spring 78 while the positioning surface 108 is in a state of contact with the reference surface 48A of the reel 40.

The brake member 80 is equipped with engagement projections 86 projecting from the top surface thereof in order to move each lock member 90, described below, from a restricting position to a restriction released position by the brake member 80 moving from the rotation locking position to the rotation permitting position. The configuration of the engagement projections 86 will be described below, along with the lock member 90.

Figure 6:
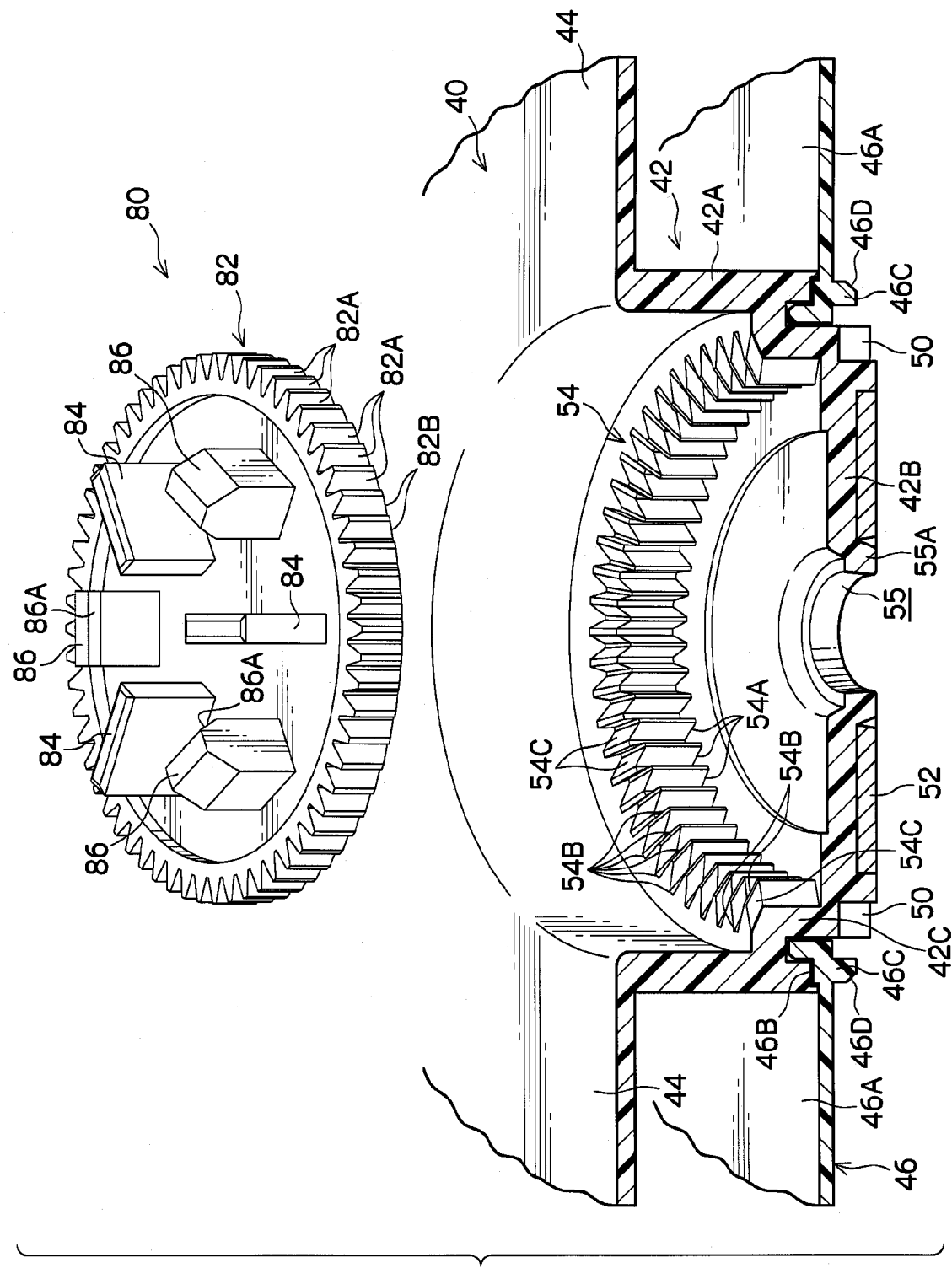
FIG. 6 is partially cut-away perspective view showing a brake member and a reel configuring a recording tape cartridge according to the first exemplary embodiment of the present exemplary embodiment.

Further explanation will now be given of the engaged gear 54 of the reel 40 and the brake gear 82 of the brake member 80. Configuration is made, as shown in FIG. 6, with tapered portions 54B, 82B formed to a portion at the tooth tip side (radial direction inside end) and tooth bottom side of each of the internal teeth 54A configuring the engaged gear 54, and to a portion at the tooth tip side (radial direction outside end) and tooth bottom side of each of the external teeth 82A configuring the brake gear 82, so as to mutually guide the engaged gear 54 and the brake gear 82 in toward the axial center side. Namely, the tapered portions 54B are formed as angled faces (inflected faces) to portions at the top end on the tooth tip side of each of the internal teeth 54A, facing toward the radial direction inside and topside. The tapered portions 82B are formed as angled faces (inflected faces) to portions at the bottom end on the tooth tip side of each of the external teeth 82A, facing toward the radial direction outside and bottom side.

In the present exemplary embodiment, as shown in FIG. 6, tapered portions 54C, 82C are formed respectively at both sides in the circumferential direction of portions of each of the internal teeth 54A including the tapered portion 54B, and portions of each of the external teeth 82A including the tapered portion 82B, in order to guide the other component in the reel circumferential direction (to guide each other to intermesh). Respective portions each of the internal teeth 54A of the engaged gear 54 and of each of the external teeth 82A of the brake gear 82, except for the tapered portions 54C, 82C in the tooth width direction of, form main meshing faces 54D, 82D. These meshing faces 54D, 82D are faces substantially parallel to the reel axial direction. It should be noted that configuration may be made in which in the tooth width direction (reel axial direction) of the engaged gear 54 and of the brake gear 82, the range in which the tapered portions 54B, 82B are formed, and the range in which the tapered portions 54C, 82C are formed, differ.

Figure 13A:
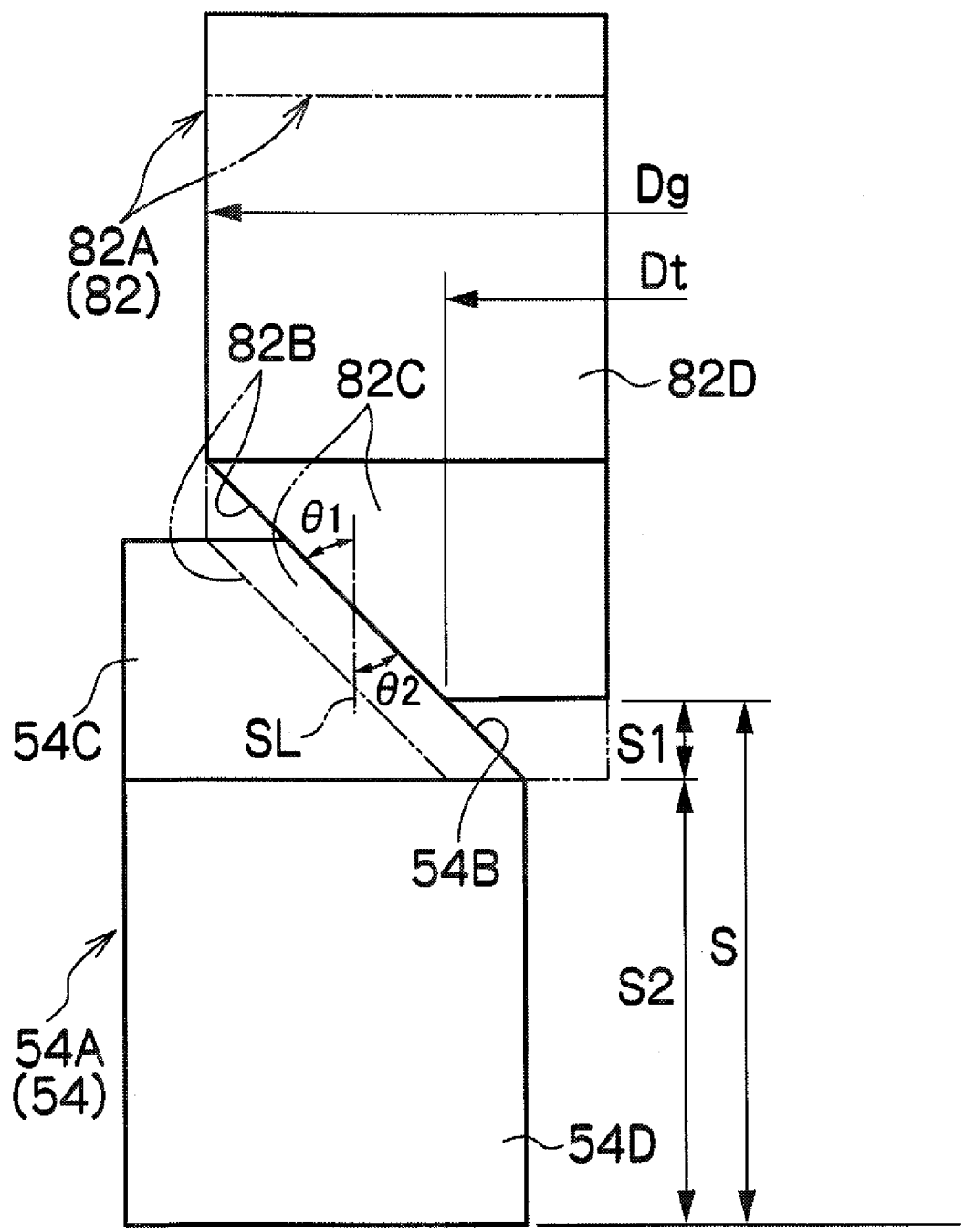
FIG. 13A is a schematic diagram for explaining a meshing release stroke of a brake gear with respect to an engaged gear configuring a recording tape cartridge according to an exemplary embodiment of the present invention.
Figure 13B:
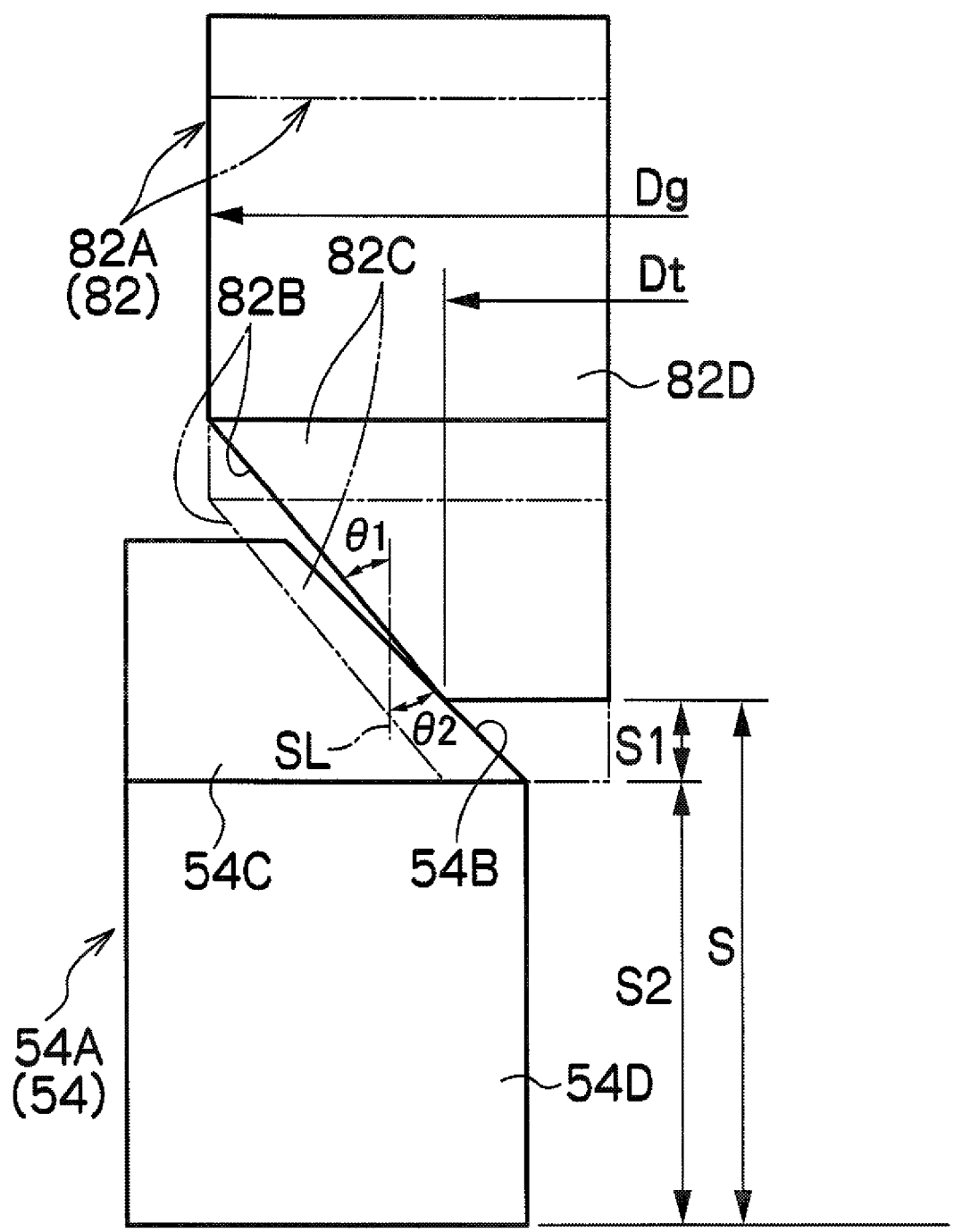
FIG. 13B is a schematic diagram for explaining a meshing release stroke of a brake gear with respect to an engaged gear configuring a recording tape cartridge according to an exemplary embodiment of the present invention.

Taper angle $\theta 1$ of the tapered portion 82B of the brake gear 82 with respect to a standard line SL that is parallel to the reel axial direction is, as shown in FIG. 13A, about the same as taper angle $\theta 2$ of the tapered portion 54B of the engaged gear 54 with respect to the standard line SL ($\theta 1 \approx \theta 2$), or, as shown in FIG. 13B, smaller than the taper angle $\theta 2$ ($\theta 1 < \theta 2$). In other words the taper angle of the tapered portion 82B with respect to the horizontal (90°-$\theta 1$) is the same as, or greater than, the taper angle of the tapered portion 54B with respect to the horizontal (90°-$\theta 2$).

The recording tape cartridge 10 is thereby configured such that the meshing stroke S1 of the tapered portions 54C with the tapered portions 82C, during the stroke S of the brake member 80 from the rotation locking position to where the locking is released, is suppressed to a small amount (this feature will be described below along with the operation of the present exemplary embodiment). It should be noted that stroke S should be understood to be the overlap amount in the reel axial direction between the brake gear 82 and the engaged gear 54, and is smaller than the stroke of movement of the brake member 80 from the rotation locking position to the rotation permitting position.

(Configuration of Reel Rattling-About Limitation Mechanism)

When the reel 40 is not in use, the reel 40 is restricted (limited) from displacement in the axial direction with respect to the case 12 by lock portions 93 of the lock members 90 being inserted into the gap G between the reel 40, in a state positioned biased to the lowest position, and the top panel 14A. Specific explanation is given below.

As shown in FIG. 2 to FIG. 4, the recording tape cartridge 10 is equipped with the lock member 90 for preventing upward or downward movement of the reel 40 with respect to the case 12, namely for preventing the ring shaped rib 46C from moving away from contact with the contact surface 16C. There are plural of the lock members 90 provided (three in the present exemplary embodiment). When explanation of the each of the lock members 90 is given below each of the directions in the assembled state will be used. In the explanation below, when "radial direction" is sometimes used this refers to the radial direction of the reel 40 accommodate in the case or to a direction parallel thereto.

Figure 5:
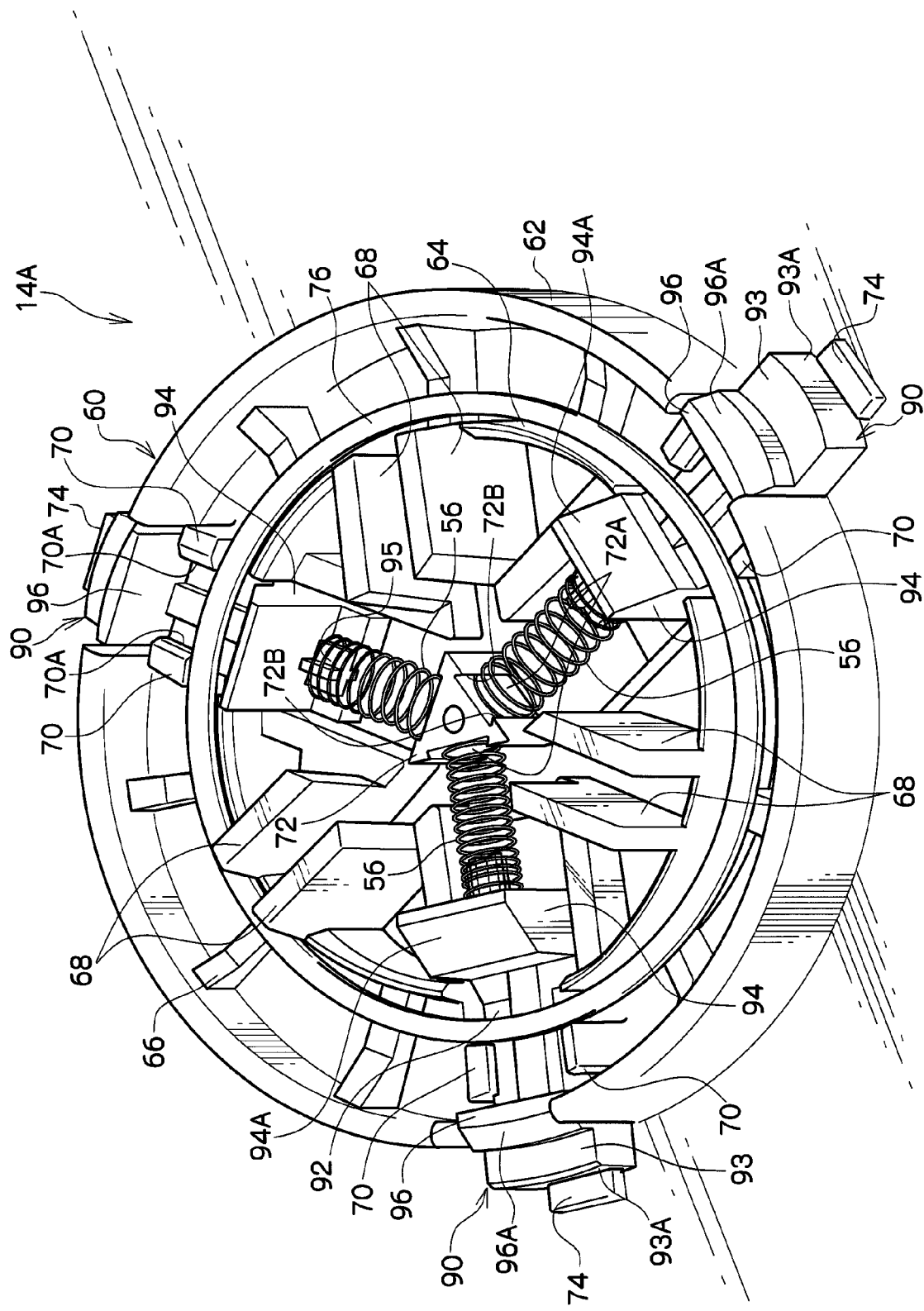
FIG. 5 is a perspective view showing a reel lock mechanism configuring a recording tape cartridge according to the first exemplary embodiment of the present exemplary embodiment, in an interim assembled state.

As shown in FIG. 4 to FIG. 6, each of the lock members 90 is equipped with a body portion 92 that is long in the radial direction and formed into substantially a rectangular pillar shape that makes slidable contact with the top panel 14A. One of the lock portions 93 is provided at the radial direction outside end of each of the body portions 92. As shown in FIG. 7, the top face of the lock portions 93 are in the same plane as the top face of the body portions 92, and the thickness D of the lock portions 93 in the up-down direction is slightly smaller than the separation distance W of the gap G between the top end face of the circular cylindrical portion 42A of the reel 40, positioned in the lowest position, and the inside face of the top panel 14A (D<W).

The lock member 90 is configured to adopt, while moving sliding against the top panel 14A in the radial direction, a restricting position (see FIG. 2) in which the lock portion 93 is inserted into the gap G and the reel 40 is restricted from rising from the lowest position, and a restriction released position (see FIG. 3) where the lock portion 93 is withdrawn from the gap G and movement of the reel 40 is permitted from the lowest position toward the raised position. In the recording tape cartridge 10, as described above, the thickness D of the lock portion 93 is set slightly smaller than the separation distance W of the gap G (D<W), and, as shown in FIG. 7, fine clearances C1, C2 are respectively formed between, between the top face of the lock portion 93 positioned in the restricting position and the bottom face of the top panel 14A, and between the bottom face of the lock portions 93 positioned in the restricting position and the top face of the top flange 44. Configuration is thereby made such that the lock portions 93 can smoothly progress into, or smoothly withdraw from, the gap G.

Each of the lock members 90 is equipped with an engagement portion 96 that projects downward from the body portion 92 at a portion at the radial direction inside end of the lock portion 93. The radial direction outer face of each of the engagement portions 96 is formed into an circular arced shape corresponding to the inner peripheral face of the circular cylindrical portion 42A, with configuration made such that when each of the lock members 90 are positioned in the restricting position, the radial direction outer face of the engagement portion 96 makes face-to-face contact with the inner peripheral face of the circular cylindrical portion 42A. It is thus configured such that movement of each the lock members 90 exceeding the restricting position toward the radial direction outside is prevented. The draw angle of the engagement portion 96 and the circular cylindrical portion 42A (at least in the vicinity of the top end thereof) is substantially 0° with respect to the reel axial direction, so that no gap arises therebetween. A tapered face 96A that faces downward and to the radial direction outside, of a circular arc shape when viewed from below, is formed to a portion at the bottom end of each of the engagement portions 96, and this is used in assembly of the lock members 90, as described below.

Each of the lock members 90 is also equipped with a cam portion 94, serving as a pressed portion, projecting downward from the radial direction inside end of the body portion 92. The cam portions 94 cooperate with the engaging projections 86, serving as pressing portions, configuring the brake member 80, so as to convert part of the locomotion of the brake member 80 moving from the rotation locking position toward the rotation permitting position into locomotion moving the lock member 90 from the restricting position toward the restriction released position, and the configuration of these components will be described later. Each of the lock members 90 is equipped with an insertion fitting portion 95 projecting toward the radial direction inside from the respective cam portion 94. Each of the insertion fitting portions 95 are formed into substantially a cross shape when viewed along their axial direction, as shown in FIG. 4, and one end of compression springs 56 is retained by the insertion fitting portion 95 being inserted therein.

Each of the lock members 90 explained above is respectively retained movable in the radial direction by a retention portion 60 provided on the top panel 14A of the case 12. As shown in FIG. 4 and FIG. 5, the retention portion 60 is equipped with ring shaped walls 62, 64 that respectively extend down from the internal face of the top panel 14A and are substantially coaxial to the reel 40 in the assembled state. The ring shaped wall 62 positioned to the outside extends out to a greater height down from the top panel 14A (the bottom end is positioned below) than the ring shaped wall 64 positioned at the inside. The external diameter of the ring shaped wall 62 is smaller than the internal diameter of the circular cylindrical portion 42A of the reel 40, and the retention portion 60 is configured so as not to interfere with the reel 40 positioned in the raised position.

Cut away portions 62A, 64A are formed in each of the ring shaped walls 62, 64, over the whole of the height thereof, aligned with each other at 3 locations at uniform intervals in the circumferential direction. The opening width of each of the cut away portions 62A, 64A corresponds to the width of the respective lock members 90. The ring shaped walls 62, 64 are connected together by plural support ribs 66 projecting from the top panel 14A. In the present exemplary embodiment there are three support ribs 66 provided in each interval between the cut away portions 62A, 64A, nine support ribs 66 in total.

The retention portion 60 is equipped with three pairs of guide walls 65 extending down from the top panel 14A at positions to the inside of the ring shaped wall 64. Each of the pairs of guide walls 65 is disposed such that opposing faces thereof are positioned to coincide with imaginary lines connecting the edges of the cut away portions 62A, 64A, when viewed from below. The guide walls 65 form accommodating portions 63, together with the cut away portions 62A, 64A, that accommodate the lock members 90 so as to be movable in the radial direction. Namely, each of the lock members 90, when in an accommodated state in a different respective accommodating portion 63, is movable in the radial direction while being guided by edge portions of the guide walls 65 and the cut away portions 62A, 64A.

In addition, respective retention projections 70 project between each of the ring shaped walls 62, 64 and between the edges of the cut away portions 62A, 64A. Each of the retention projections 70 is positioned on a line extending from each of the corresponding guide walls 65, and an engagement protrusion 70A is provided at the bottom end of the respective retention projection 70, extending out below the accommodating portions 63. The bottom end at the side that faces the engagement protrusion 70A on the other side of each of the engagement protrusions 70A is a tapered face, so as to engage the lock member 90 at the corner portion of the body portion 92 when assembled from below. Thereby, when the lock members 90 are being assembled, the pairs of retention projections 70 deform, permitting the lock members 90 to be mounted in the accommodating portions 63, and when mounted the engagement protrusions 70A prevent the lock member 90 from coming out from the accommodating portions 63. Namely, configuration is made such that even if the top panel 14A were to be placed facing down (vertically down), each of the lock members 90 is in an interim retained state from falling out of the retention portion 60.

A spring receiving projection 72 projects from a portion at the axial center of the retention portion 60. The spring receiving projection 72 is substantially triangular in shape formed from three spring receiving faces 72A corresponding to the three lock members 90, with latching claws 72B formed at both sides in the width direction of each of the spring receiving faces 72A. The spring receiving projection 72 is used for supporting the compression springs 56, as will be described later.

Also, stopper ribs 74 project from the top panel 14A at the outside of the ring shaped wall 62, the stopper ribs 74 being along a circular circumference coaxial to the ring shaped wall 62. Each of the stopper ribs 74 is disposed to the radial direction outside of the respective accommodating portion 63, and is used for stopping the lock member 90 in the interim. Each of the stopper ribs 74 is disposed just further to the radial direction outside than the radial direction outside end of the lock portion 93 of the lock member 90 positioned in the restricting position. The separation distance between the radial direction outside end of the lock portions 93 in this state and the stopper ribs 74 is slightly smaller than a projected length of the tapered face 96A onto a horizontal plane (a plane orthogonal to the reel axial direction). The stopper ribs 74 are made to project from the top panel 14A with a height suppressed low enough so that they do not interfere with the reel 40 positioned in the raised position.

Also, one set of two guide wall portions 68 extends down from the top panel 14A at the inside of the ring shaped wall 64, between each of the respective pairs of guide walls 65. Namely, there are three sets, a total of six, of the guide wall portions 68, configured such that the guide lugs 84 of the brake member 80 are inserted between each of the respective sets. The facing separation between the guide wall portions 68 in each set is about the same as, or slightly larger than, the thickness of the guide lugs 84, such that rotation of the brake member 80 is prevented and rattling about is suppressed. Each of the guide wall portions 68 is of a height such that the guide lugs 84 of the brake member 80 moving between the rotation locking position and the rotation permitting position always maintain an inserted state. The respective radial direction inside end of each of the guide wall portions 68 is also provided contiguous to the guide wall 65 and the radial direction outside end is provided contiguous to the ring shaped wall 64.

The retention portion 60 as explained above may also be configured as a plate shaped member, as a separate member from the top panel 14A, and attached to the top panel 14A. By configuring in such a manner the lock member 90 and the retention portion 60 can be made modularized, and, for example, there is the merit that common use may be made of a mold for a recording tape cartridge not provided with a lock member 90 and a metal case 12 (upper case 14). In the above configuration, since the engagement protrusions 70A of the retention projections 70 are formed into an under-cart structure it is difficult to increase the size of the engagement protrusions 70A. However, by providing a through hole between the retention projections 70 with the plate shaped member described above it is possible to avoid an under-cart structure. In such a configuration the engagement protrusions 70A can be increased in size and the ring shaped stopper fitting 76, described below, can be dispensed with. Also, even if only the retention projections 70 are configured as separate components for subsequent attachment to the upper case 14, the ring shaped stopper fitting 76 can also be dispensed with.

Each of the lock members 90 are accommodated in a different one of the accommodating portions 63 in the retention portion 60 described above. Each of the lock members 90 are thereby disposed with an even separation in the circumferential direction of the reel 40, such that each of the lock members 90 is guided so as to only move in the radial direction while sliding along the top panel 14A. In this state each of the lock members 90 is held in the final manner by the ring shaped stopper fitting 76 fixed to each of the support ribs 66, and the lock members 90 are assuredly prevented from coming out from the retention portion 60. The ring shaped stopper fitting 76 is fixed to the bottom face of each of the support ribs 66 by, for example, ultrasonic welding. In the present exemplary embodiment the ring shaped stopper fitting 76 is also employed as a spring seat for receiving the upper end of the compression coil spring 78 thereon. It should be noted that the upper end of the compression coil spring 78 may be seated on each of the support ribs 66.

The compression springs 56, serving as second biasing members, are disposed at portions at the axial center of the retention portion 60, biasing each of the lock members 90 toward the restricting position side. The compression springs 56 are provided one for each of the lock members 90, and one end of each is retained by fitting over the insertion fitting portion 95 of the corresponding lock member 90, and the other end abuts the respective spring receiving face 72A of the spring receiving projection 72. This other end of the compression spring 56 is prevented from misalignment with respect to the spring receiving face 72A by the latching claws 72B of the spring receiving projection 72.

Each of the compression springs 56 is configured to be in a compressed state when in a state in which the lock portion 93 of the corresponding lock member 90 abuts the stopper rib 74, and in the state in which the engagement portion 96 abuts the inside face of the circular cylindrical portion 42A of the reel 40. Namely, the compression springs 56 bias the lock members 90 to the radial direction outside, and configuration is made such that this biasing force presses the engagement portion 96 against the circular cylindrical portion 42A of the reel 40, or presses the lock portion 93 against the stopper rib 74.

Configuration is made in the recording tape cartridge 10 such that, before the upper case 14 and the lower case 16 are joined together, as shown in FIG. 5, the lock portion 93 of the lock member 90 is pressed against the stopper rib 74 by the biasing force of the compression springs 56. When the upper case 14 in this state is assembled to the lower case 16 with the reel 40 in the positioned biased to the lowest position with the brake gear 82 of the brake member 80 mounted with the compression coil spring 78 meshed with the engaged gear 54, while the inside edge portion at the top end of the circular cylindrical portion 42A engages with the tapered face 96A of the lock member 90, a portion of biasing force in the reel axial direction is converted into locomotion of each of the lock members 90 toward the outside in the radial direction, and each of the lock members 90 moves to the restricting position from the interim retained position described above against biasing force of the compression springs 56. It should be noted that before assembly the brake member 80 is positioned so that each of the guide lugs 84 of the brake member 80 are inserted between the corresponding guide wall portions 68 by the above action. The door 30 is also axially supported by the support shafts 26 by the above action. The recording tape cartridge 10 is then assembled by joining together the upper case 14 and the lower case 16 in the above state.

Figure 9:
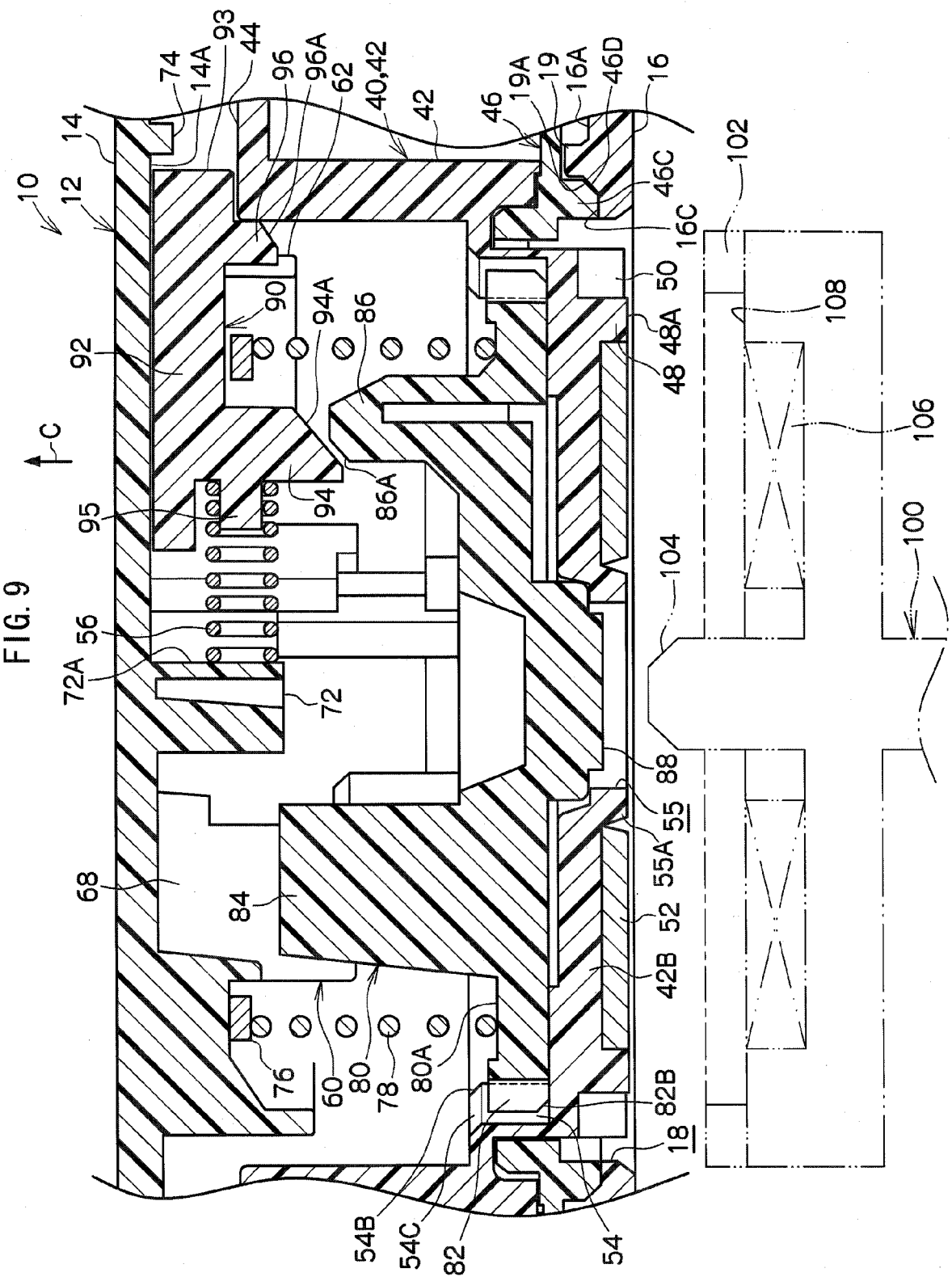
FIG. 9 is a lateral cross-section showing an enlargement of a recording tape cartridge according to the first exemplary embodiment of the present exemplary embodiment, in a not-in-use state.

In the assembled state, namely in the shipping state that is a not-in-use state, as shown in FIG. 2 and FIG. 9, the reel 40 is positioned in the lowest position due to biasing force of the compression coil spring 78, the brake member 80 is positioned in the rotation locking position due to biasing force of the compression coil spring 78, and each of the lock members 90 is positioned in the restricting position due to biasing force of the compression springs 56. Consequently, the reel 40 positioned in the lowest position is prevented from rotating with respect to the case 12 by the brake member 80, and also movement in the axial direction with respect to the case 12, namely movement toward the raised position, is restricted by each of the lock members 90. The state of the recording tape cartridge 10 is referred to as being the not-in-use state.

In the recording tape cartridge 10, as described above, by the rotation shaft 100 moving the brake member 80 from the rotation locking position to the rotation permitting position, each of the lock members 90 is moved from the restricting position to the restriction released position. Specifically, as shown in FIG. 5, the top ends of each of the engagement projections 86 that project from the top face of the brake member 80 are formed with tapered faces 86A that face toward the radial direction inside and upwards, and the bottom ends of the cam portions 94 that project downward from the radial direction inside ends of each of the lock members 90 are formed with tapered faces 94A that face toward the radial direction outside and downwards, so that the tapered faces 86A and the tapered faces 94A have sloping angles which correspond with each other and enable face-to-face contact. The sloping angle is set in the range of from 30° to 60°, and in the present exemplary embodiment is 45°.

Figure 10:
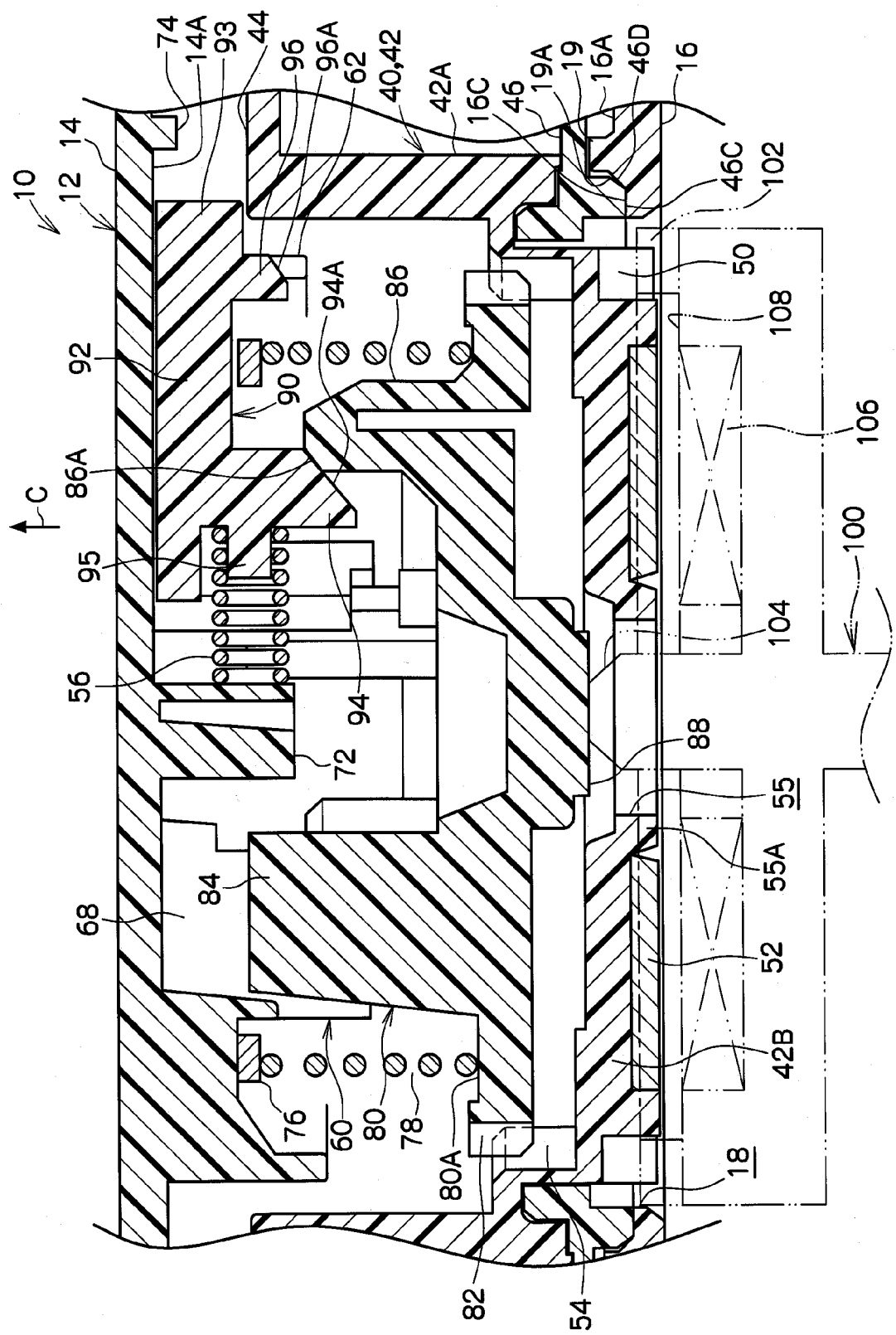
FIG. 10 is a lateral cross-section showing an enlargement of a recording tape cartridge according to the first exemplary embodiment of the present exemplary embodiment, on the way of a reel lock release thereof.
Figure 11:
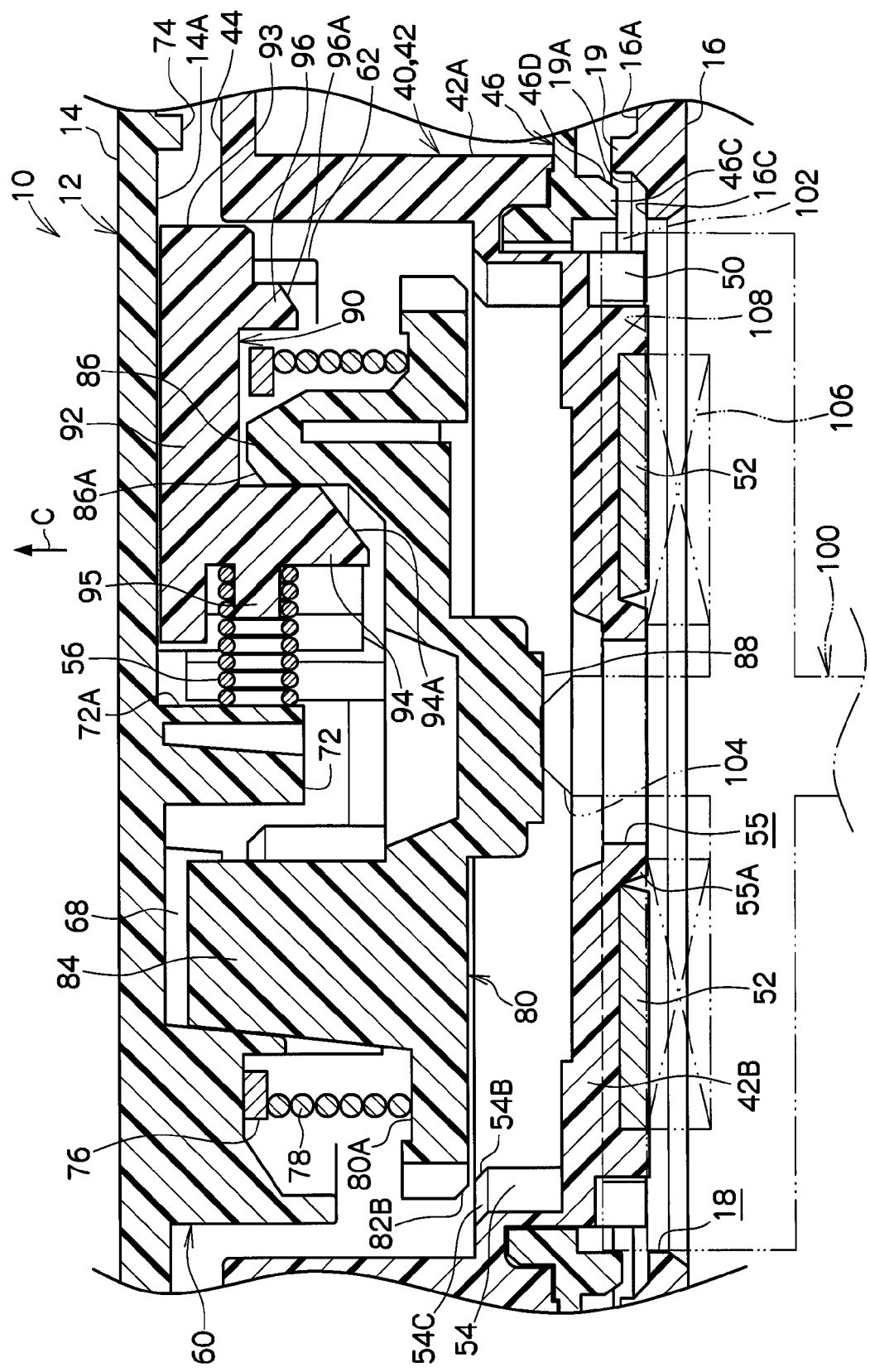
FIG. 11 is a lateral cross-section showing an enlargement of a recording tape cartridge according to the first exemplary embodiment of the present exemplary embodiment, in a reel-rotation state.

Consequently, configuration is made such that when the brake member 80 moves upward with respect to the case 12, while the respective tapered faces 86A and tapered faces 94A are in contact with each other, the locomotion upward (toward the top in the reel axial direction) of the brake member 80 is converted into locomotion that moves each of the lock members 90 toward the radial direction inside. Thereby, the state is arrived, through the state shown in FIG. 10, where each of the lock members 90 has moved to the restriction released position and the reel 40 had also moved up to the raised position, as shown in FIG. 3 and FIG. 11. The state of the recording tape cartridge 10 at this time will be referred to as the in-use state.

In the in-use state the respective cam portion 94 of each of the lock members 90 is inserted to the inside of the corresponding engagement projection 86 of the brake member 80, such that radial direction outward facing face of each of the cam portion 94 abuts the radial direction inward facing face of the corresponding engagement projection 86. The radial direction outward facing face of each of the cam portions 94 of each of the lock members 90 and the radial direction inward facing face of each of the engagement projections 86 of the brake member 80 have respective draft angles of substantially 0°, a configuration such that no component of force acting in the reel 40 axial direction arises due to biasing force from the compression coil spring 78 and the compression spring 56 when in the in-use state.

However, when in the not-in-use state, as shown in FIG. 9, the there is a specific clearance set between the tapered faces 86A of each of the engagement projections 86 and the tapered faces 94A of each of the cam portions 94. A component of biasing force from the compression spring 56 is thereby prevented from acting on the brake member 80. This clearance (separation distance along the reel axial direction) is also smaller than the meshing amount (stroke S) along the reel axial direction between the brake gear 82 and the engaged gear 54. Namely, the tapered faces 94A interfere with each other before the meshing of the brake gear 82 and the engaged gear 54 is released the tapered faces 86A.

Explanation will now be given of details regarding the movement restricted state of the reel 40 in the axial direction due to each of the lock members 90. As shown in FIG. 7, the lock portion 93 has a length L along the radial direction that is about the same as, or less than, the thickness Tr of the circular cylindrical portion 42A of the reel 40 along the radial direction. Consequently, radial direction outside end 93A, of the lock portion 93 of each of the lock members 90 positioned in the restricting position, is positioned in the range of the thickness Tr of the circular cylindrical portion 42A. In the state in which each of the lock members 90 is placed in the restricting position, the radial direction outside end 93A of each of the lock portions 93 is positioned further to the radial direction outside than the inside face (internal diameter di) of the ring shaped rib 46C of the reel 40. It should be noted that when the internal diameter of the gear opening 18 of the case 12, namely the diameter of the inner edge of the contact surface 16C, is greater than the internal diameter $d_i$ of the ring shaped rib 46C, length L is set such that the radial direction outside end 93A of the lock portion 93 of each of the lock members 90 positioned in the restricting position is positioned further to the radial direction outside than the inner edge of the contact surface 16C.

Consequently, contact surface 16C of the case 12 and the lock portions 93 of the lock members 90 positioned in the restricting position are positioned mutually overlapped in the range of thickness Tr of the circular cylindrical portion 42A along the radial direction of the reel 40 (so as to be superimposed in projection along the reel axial direction). Since the contact surface 16C is ring shaped (an endless shape), the contact surface 16C and the lock portion 93 are also overlapped in the circumferential direction of the circular cylindrical portion 42A in the range of the thickness Tr. In other words, the that contacts the lock portion 93 of the reel 40 attempting to move to the top panel 14A side, and the that contacts the contact surface 16C of the reel 40 attempting to move to the bottom panel 16A side, overlap each other when viewed along the reel 40 axial direction, in the radial direction of the circular cylindrical portion between the inside and outside peripheral faces of the circular cylindrical portion 42A (in the range of the thickness Tr), and in the circumferential direction Due to the above, in the recording tape cartridge 10 when in the not-in-use state, configuration is made such that from all of the faces of the reel 40 facing up or down, only the top end face of the circular cylindrical portion 42A positioned in the range of the thickness Tr of the circular cylindrical portion 42A (between the inside and outside peripheral faces thereof), and the bottom end face of the ring shaped rib 46C contact, or become very close to contact, with the lock portion 93 of the respective lock members 90 or the contact surface 16C of the case 12. Namely, configuration is made such that movement restricting force in the up-down direction, to restrict up or down movement when the reel 40 attempts to move up or down, only acts on the portions of the reel 40 in the range of the thickness Tr of the circular cylindrical portion 42A. In addition, since the lock portions 93 of the lock members 90 positioned in the restricting position as described above, overlap with the contact surface 16C of the case 12 in the range of the thickness Tr, the above movement restricting force does not cause a couple to be generated that tilts the reel 40 with respect to the case 12 (it is also not necessary to provide plural lock portions 93 in order to cancel out a couple).

Figure 12:
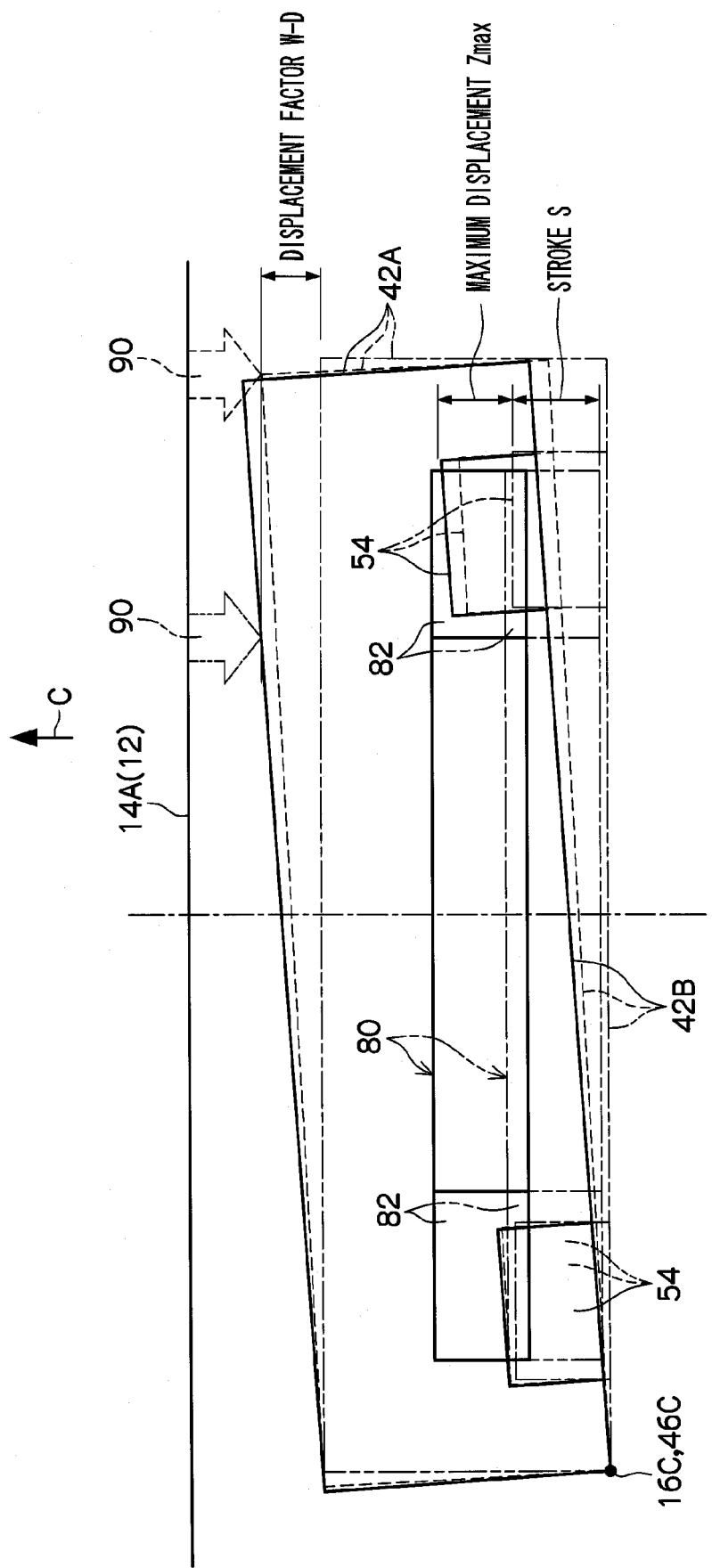
FIG. 12 is a schematic diagram showing a tilted state of a reel within a case in a recording tape cartridge according to the first exemplary embodiment of the present exemplary embodiment.

In the recording tape cartridge 10 as described above, in order to ensure the slidability of the lock member 90 against the case 12 (retention portion 60), the thickness D of the lock portion 93 is set, as described above, to be smaller than the separation distance W in the up-down direction of the gap G between the reel 40 with ring shaped rib 46C contacting the contact surface 16C of the case 12 and the top panel 14A. Therefore, when not in use the recording tape cartridge 10 the reel 40 is able to displace with respect to the case 12 by the difference (W–D) between the thickness D of the lock portions 93 of the lock members 90 and the separation distance W in the up-down direction of the gap G. The sum of the slight clearances C1, C2 in the up-down direction of the lock portions 93 positioned in the restricting position is the displacement difference (W–D) of the reel 40, and the reel 40 can obtain a tilt with respect to the case 12 as schematically shown in FIG. 12. As shown in FIG. 12, when the reel 40 is tilted with respect to the case 12 about a rotation center of the contact position between the contact surface 16C of the case 12 and the ring shaped rib 46C, if there is a lock member 90 positioned at 180° from the rotation center in plan view, the maximum amount of displacement at the circular cylindrical portion 42A of the reel 40, as shown by the even-dashed line in FIG. 12, substantially matches the displacement difference (W–D). However, if the above position at 180° from the rotation center is a portion central between adjacent lock members 90 in the circumferential direction, then, as shown in FIG. 12, the displacement at the circular cylindrical portion 42A of the reel 40 is greater than the displacement difference (W–D). Note that the double-dashed line in FIG. 12 shows the reel 40 in the lowest position and the brake member 80 positioned in the rotation locking position.

In the state of maximum displacement of the circular cylindrical portion 42A of the reel 40 for the displacement difference (W–D) in the up-down direction, the displacement amount of the location formed with the engaged gear 54 (position in the radial direction) will be referred to as maximum displacement Zmax. In the recording tape cartridge 10, as shown in FIG. 12, the above described displacement difference (W–D) and stroke S are set such that the stroke S along the reel axial direction for releasing meshing of the brake gear 82 of the brake member 80 with the engaged gear 54 of the reel 40 is larger than the maximum displacement Zmax. It should be noted that the stroke S is the stroke from the rotation locking position along the reel axial direction until each of the external teeth 82A of the brake gear 82 are removed from between the internal teeth 54A of the engaged gear 54. Namely, the stroke S should be understood to be the overlap amount in the reel axial direction between the brake gear 82 and the engaged gear 54, and can be made to be a portion of the displacement range of the brake member 80 up to the rotation permitting position.

Explanation will now be given of the operation of the first exemplary embodiment.

When the recording tape cartridge 10 configured as above is not in use (when not loaded in the drive device), such as during storage or transportation, the door 30 blocks off the opening 20 due to biasing force of the torsion spring 28. The leader tape 22 is also disposed along the left side wall 12B by the extending portions 22B of the leader tape 22 being housed (inserted) and retained within the slots 24.

Due to biasing force of the compression coil spring 78 the reel 40 is positioned in the lowest position with the bottom end face of the ring shaped rib 46C making contact with the contact surface 16C of the case 12, and also the brake member 80 is positioned in the rotation locking position with the brake gear 82 meshed with the engaged gear 54 of the reel 40. In addition, due to biasing force of the compression springs 56, each of the lock members 90 is positioned in the restricting position with the respective lock portions 93 thereof inserted into the gap G between the top panel 14A and the top end face of the circular cylindrical portion 42A. Namely, as shown in FIG. 2 and FIG. 9, the recording tape cartridge 10 is in the not-in-use state.

The reel 40 is thereby prevented from rotating with respect to the case 12, and is restricted from moving in the up-down direction with respect to the case 12 by more than the permitted amount (an amount sufficiently small with respect to the movement amount from the lowest position to the raised position and to the separation distance W in the up-down direction or the gap G). Consequently, if a user unintentionally presses a portion on the bottom of the reel 40 (the reel plate 52 or the like), or even if the recording tape cartridge 10 is dropped, the reel 40 is suppressed from rattling around or tilting (changing orientation) within the case 12.

However, when the magnetic tape T is to be used, the recording tape cartridge 10 is loaded front wall 12A side first into a bucket (not illustrated in the drawings) of the drive device. Accompanying this loading operation an opening and closing member of the drive device (not illustrated in the drawings) presses a portion on the door 30 further to the right than the support shafts 26. The door 30 is thereby rotated about the support shafts 26 as the center of rotation against biasing force of the torsion spring 28, and the opening 20 is opened.

Next, with the opening 20 maintained in the open state, the bucket is lowered, and the rotation shaft 100 of the drive device relatively approaches from the bottom side of the case 12 (moves up with respect to the case 12). When this occurs, as shown in FIG. 10, while the release projection 104 of the rotation shaft 100 is pressing the operation projection 88 of the brake member 80, the release projection 104 proceeds into and is fitted into the through hole 55 of the reel 40. The brake member 80 is thereby pressed upward against biasing force of the compression coil spring 78 (moved relative to the reel 40 to the rotation permitting position), and the rotationally locked state of the reel 40 due to the brake member 80 is released.

Accompanying the movement of the brake member 80 upward, while the tapered faces 86A of each of the engagement projections 86 of the brake member 80 and the tapered faces 94A of the cam portions 94 of each of the lock members 90 slide against each other, the locomotion upward of the brake member 80 is converted into locomotion of each of the lock members 90 toward the radial direction inside. Each of the lock members 90 is thereby moved from the restricting position to the restriction released position.

When the rotation shaft 100 is moved further upward, the drive gear 102 is meshed with the reel gear 50 while the rotation shaft 100 presses the brake member 80 further upward. The lock portions 93 of each of the lock members 90 are thereby removed completely from the gap G before the reference surface 48A of the reel 40 makes contact with the positioning surface 108 of the rotation shaft 100. When the positioning surface 108 of the rotation shaft 100 has made contact with the reference surface 48A of the reel 40 the rotation shaft 100 moves further upward together with the reel 40 and the brake member 80.

Then when the bucket has been lowered by its set stroke and stopped moving, movement of the rotation shaft 100 with respect to the case 12 ceases, and, as shown in FIG. 3 and FIG. 11, the reference surface 48A of the reel 40 makes contact with the positioning surface 108, positioning the reel 40 in the axial direction thereof in the rotation permitting position, raised within the case 12. In this state the reel 40 is retained by the rotation shaft 100 due to attraction force from the magnet 106 attracting the reel plate 52.

In this state the brake member 80 is retained in the rotation permitting position (an absolute rotation permitting position with respect to the case 12) with the operation projection 88 making contact with the release projection 104. The reel 40 is centered with respect to the rotation shaft 100 by the release projection 104 fitting into the through hole 55, as described above. In addition each of the lock members 90 is positioned with the respective cam portion 94 thereof positioned to the inside of the corresponding engagement projection 86 of the brake member 80 that being retained in the above rotation permitting position (positioned in an absolute restriction released position with respect to the case 12), and movement to the radial direction outside, namely toward the restricting position side, is prevented with certainty.

The non-illustrated pulling out member of the drive device then approaches the opening 20 from the left side wall 12B side, and engages the hole 22A of the leader tape 22. When this occurs the pulling out member can engage with the hole 22A with certainty since the leader tape 22 is in a standby state adjacent to the left side wall 12B. The pulling out member engaged with the hole 22A separates away from the opening 20 and pulls the leader tape 22 out from the case 12, and engages the leader tape 22 so as to enable take-up with a non-illustrated take-up reel of the drive device.

In this state the drive device rotationally drives the take-up reel and the rotation shaft 100, namely the reel 40, in synchronization with each other. The magnetic tape T is thereby progressively fed out to the drive device side. Data is then recorded on the magnetic tape T, or data recorded on the magnetic tape T is reproduced, by a recording and reproducing head (not illustrated in the drawings) disposed along a specific tape path of the drive device.

In order to eject the recording tape cartridge 10 from the drive device, first the drive gear 102 and the rotation shaft 100, namely the reel 40, are rotated in reverse, and the magnetic tape T is rewound onto the reel 40. The leader tape 22 is then removed from the take-up reel, and returned to within the case 12 through the opening 20. In other words, the extending portions 22B of the leader tape 22 are housed (inserted) in the slots 24, and retained in a specific position in the case 12.

The drive device next raises the bucket, namely the recording tape cartridge 10. When this is done the meshed state of the reel gear 50 with the drive gear 102 is released, and the release projection 104 retreats out from the through hole 55 and contact ceases between the operation projection 88 and the release projection 104. Due to biasing force of the compression coil spring 78 the brake member 80 returns to the rotation locking position, in which the brake gear 82 is meshed with the engaged gear 54. When this occurs, the reel 40 returns to the lowest position due to biasing force of the compression coil spring 78. Due to the brake member 80 returning to the rotation locking position, movement of each of the lock members 90 toward the radial direction outside becomes possible, and due to biasing force of the reel compression springs 56 the lock members 90 return to the restricting position with the lock portions 93 inserted into the gap G.

The recording tape cartridge 10 is ejected from the bucket in this state. The engaged state of the opening and closing member of the drive device and the door 30 is released by the ejection action, and the door 30 returns to the position where it blocks off the opening 20 due to biasing force of the torsion spring 28. The recording tape cartridge 10 ejected from the bucket of the drive device consequently is returned to its initial state with the opening 20 closed off, and rotation and movement of the reel up or down prevented.

There are, however, occasions, such as when the recording tape cartridge 10 is dropped onto the floor or the like, when the reel 40 tilts within the case 12 with respect to the case 12 against biasing force of the compression coil spring 78, due to the dropping impact or the like. In such cases, the brake member 80 substantially maintains its orientation with respect to the case 12, due to the engagement of the guide wall portions 68 and the engagement projections 86, and is raised toward the top panel 14A side against biasing force of the compression coil spring 78 due to the reel 40 tilting with respect to the case 12 in the above described manner.

When this occurs, since in the recording tape cartridge 10, in the not-in-use state, between the reel 40 positioned biased to the bottom panel 16A side within the case 12 and the top panel 14A, the lock portions 93 of the lock members 90 are inserted between the top panel 14A of the case 12 and the reel 40, so as to restrict relative displacement between the reel 40 and the case 12 in the axial direction, tilting of the reel 40 with respect to the case 12 is suppressed even in case where it is dropped. The amount of relative tilting, between the brake member 80, with restricted change in orientation (tilting) with respect to the case 12 due to engagement of the guide wall portions 68 and the guide lugs 84, and the reel 40 is therefore limited.

The present recording tape cartridge 10 is configured to lock rotation of the reel 40 with respect to the case 12 by meshing the engaged gear 54 of the reel hub 42 with the brake gear 82 of the brake member 80, therefore the meshing amount (overlap in the axial direction) of the internal teeth 54A and the external teeth 82A can be set larger, for example, in comparison to a configuration in which gears are formed on a bottom face of a brake gear and a top face of a hub portion that face each other. In the present recording tape cartridge 10 the range of relative tilt of the reel 40 and the brake member 80 is therefore restricted by the lock members 90 as described above, and meshing of the engaged gear 54 and the brake gear 82 is readily maintained. However, since the main meshing faces of the engaged gear 54 and the brake gear 82 are substantially parallel to the reel axial direction, force attempting to rotate the reel 40 does not generate a thrust between the engaged gear 54 and the brake gear 82 (or any thrust force is extremely small), and the rotationally locked state of the reel 40 with respect to the case 12 is maintained so as long as even slight meshing is maintained.

In addition, in the recording tape cartridge 10 the stroke S for releasing meshing of the brake gear 82 with respect to the engaged gear 54 is greater than the maximum displacement Zmax of the engaged gear 54 when the reel 40 is tilted to the maximum extent with respect to the case 12, therefore when relative tilting occurs between the reel 40 and the brake member 80 due to dropping such as shown in FIG. 12, the meshing of the engaged gear 54 and the brake gear 82 is maintained for the internal teeth 54A and the external teeth 82A around the entire circumferential direction. Therefore, even if suppose a lag occurs in the brake member 80 following the movement of the reel 40, meshing of the engaged gear 54 and the brake gear 82 is maintained around substantially all of the circumference, and so the rotationally locked state of the reel 40 with respect to the case 12 is maintained.

The brake member 80 is sufficiently light in comparison to the reel 40 wound with magnetic tape T, and so there are no occasions in which the brake member 80 independently displaces in the reel axial direction or tilts relative to the reel 40, nor occasions of conceivable dropping impacts in which the displacement against biasing force of the compression coil spring 78 exceeds the stroke S (including occasions in which a portion in the circumferential direction exceeds).

Consequently, tilting of the reel 40 with respect to the case 12 is limited by the lock member 90 in the above described manner, and meshing of the brake gear 82 and the engaged gear 54 can be maintained. Also, since the brake gear 82 and the engaged gear 54 are an internal tooth or a brake gear with tooth depth direction matching the radial direction, the meshing (overlap) amount thereof is secured, and a configuration can be realized in which there is no releasing of the meshing of the brake gear 82 with respect to the engaged gear 54 due to rotation force of the reel 40 since the meshing faces are configured along the reel axial direction.

In the recording tape cartridge 10, since the tapered portions 54B, 82B are respectively formed to the engaged gear 54 and the brake gear 82, when the brake member 80 is being assembled within the reel hub 42, the tapered portions 54B, 82B guide each other together, and the brake gear 82 can be readily centered with respect to the engaged gear 54. Since tapered portions 54C, 82C are also respectively formed to the engaged gear 54 and the brake gear 82, the brake gear 82 can be readily meshed with the engaged gear 54 while being centered with respect to the engaged gear 54.

In the recording tape cartridge 10 since the taper angle $\theta 1$ of the tapered portion 82B with respect to the standard line SL is smaller than the taper angle $\theta 2$ of the tapered portion 54B with respect to the standard line SL, the meshing stroke S2 of the meshing faces 54D, 82D that are substantially parallel to the reel axis within the stroke S required to release meshing of the engaged gear 54 and the brake gear 82 can be made large.

Figure 13C:
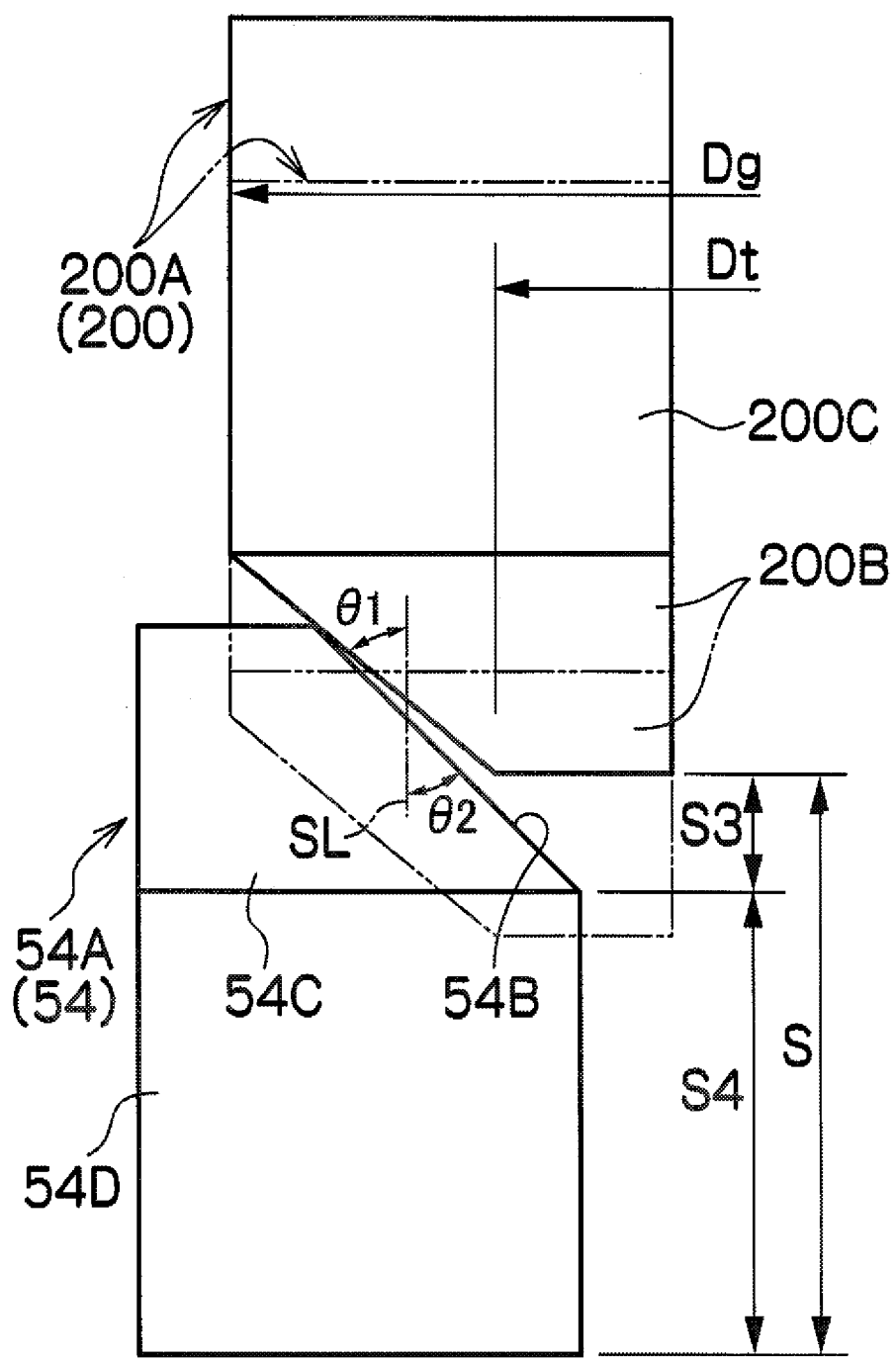
FIG. 13C is a schematic diagram for explaining a meshing release stroke of a brake gear with respect to an engaged gear according to a comparative example.

Further explanation will be given of this feature by comparison with a comparative example shown in FIG. 13C. In the comparative example shown in FIG. 13C, in place of the brake gear 82 there is provided a brake gear 200 having a gear diameter $D_g$, with an taper portion start diameter $D_t$ that is equivalent to that of the brake gear 82, and external teeth 200A formed with $\theta 1 > \theta 2$. As can be seen from comparison of FIG. 13C with FIG. 13A and FIG. 13B, in the configuration of the comparative example, the stroke S3 of the tapered portions 54C and the tapered portions 200B within the stroke S is larger than that of the above described stroke S1 (S3>S1), and therefore the meshing stroke S4 of the meshing faces 54D, 200C is comparatively small within the limited stroke S. In comparison, in the recording tape cartridge 10, since $\theta 1 < \theta 2$, the meshing stroke S1 of the tapered portions 54C, 82C is suppressed, and the meshing stroke S2 of the meshing faces 54D, 82D is relatively large, and a larger stroke S2 than above stroke S4 is secured (S2>S4).

Thereby when the recording tape cartridge 10 is in the movement range from the rotation locking position to the rotation permitting position (without making the movement separation distance longer), effective meshing of the brake gear 82 with respect to the engaged gear 54 can be maintained. The meshing (overlap) amount described above of the brake gear 82 with the engaged gear 54 can also be secured by the design of the shape of the engaged gear 54 and the brake gear 82, and therefore this also contributes to maintaining the rotationally locked state of the reel 40 when the recording tape cartridge 10 is dropped.

In the above manner, the recording tape cartridge 10 according to the first exemplary embodiment of the present invention can prevent release of the rotation lock of the reel 40 with respect to the case 12 accompanying dropping.

However, with the leader tape 22 retained with respect to the case 12 with the extending portions 22B inserted into the slots 24, if the leader tape 22 is pulled inwards in the case in this state the extending portions 22B might have sometimes deformed while interfering with the stopper wall of the slots 24, overridden past the stopper portions. In such cases, since the correct retention of the leader tape 22 with respect to the case 12 is eliminated, this would later cause problems in pulling out the magnetic tape T.

In the present recording tape cartridge 10, since rotation of the reel 40 when dropped with respect to the case 12 is prevented in the above manner, elimination of the retained state of the leader tape 22 with respect to the case 12 due to the leader tape 22 being pulled into the case can be prevented, or effectively suppressed.

Second Exemplary Embodiment

Figure 15:
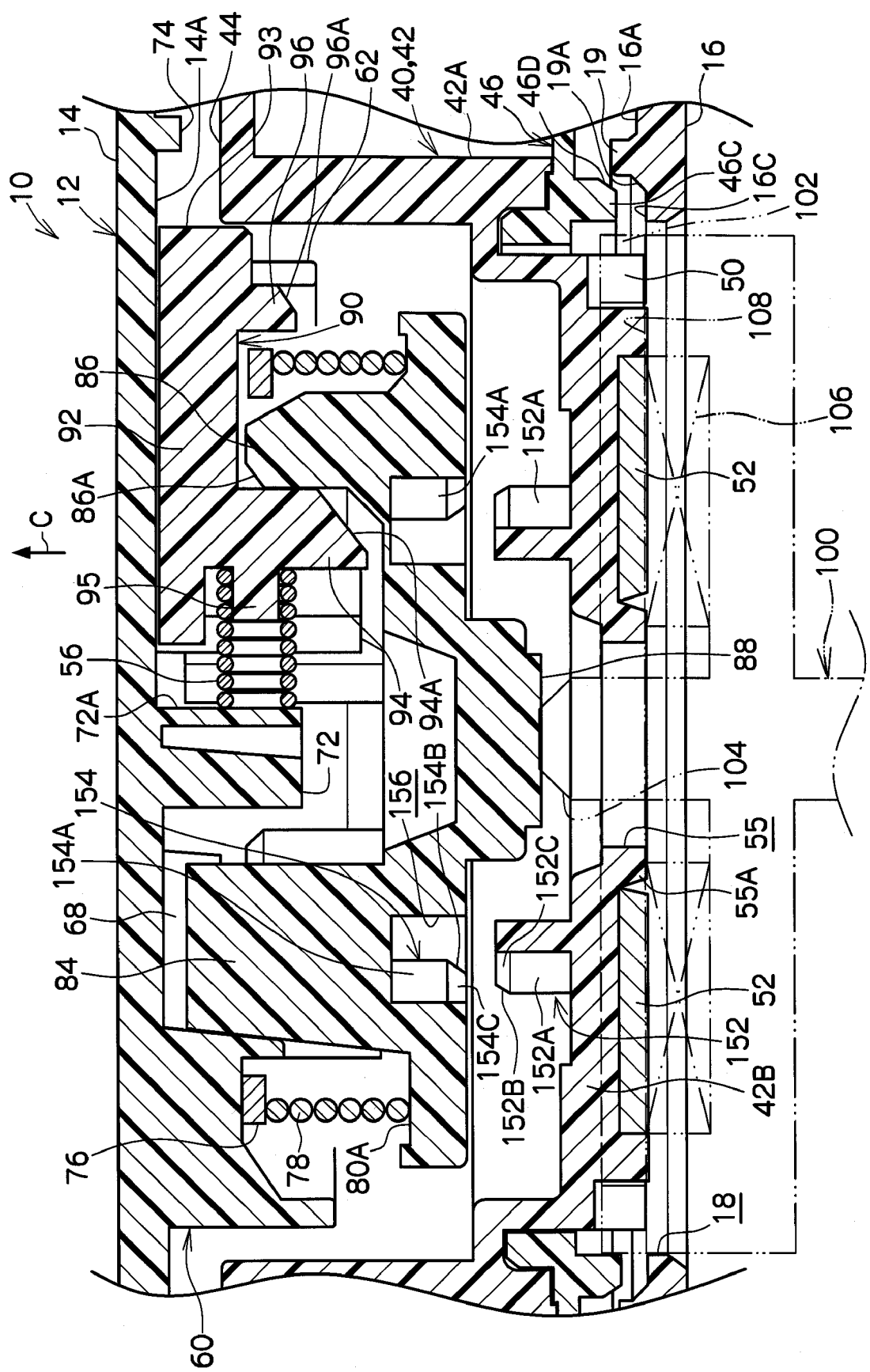
FIG. 15 is a lateral cross-section showing an enlargement of a recording tape cartridge according to a second exemplary embodiment of the present invention, in a reel-rotation state.

A recording tape cartridge 150 according to a second exemplary embodiment is shown in FIG. 14 and FIG. 15, corresponding to the cross-sections shown in FIG. 9 and FIG. 11. As shown in the drawings, the recording tape cartridge 150 differs from the recording tape cartridge 10 according to the first exemplary embodiment in that it is equipped with an engaged gear 152 provided on the reel 40 side in place of the engaged gear 54, and with a brake gear 154 provided on the brake member 80 side in place of the brake gear 82.

The engaged gear 152 extends up, along a circular circumference coaxial to the reel hub 42, from a portion of the bottom plate portion 42B of the reel hub 42 that is between the through hole 55 and the inner circular cylindrical portion 42C (circular cylindrical portion 42A). In the present exemplary embodiment the engaged gear 152 is formed into a ring shape overall, formed as an external toothed gear that is meshable with the brake gear 154 by relative movement in the axial direction. The brake gear 154 is formed, as an external toothed gear meshable with the engaged gear 152, inside a ring shaped groove 156 that is formed in the brake member 80 so as to open downwards.

The brake member 80 configuring the recording tape cartridge 150 is configured so as to be able to adopt, by relative displacement of the brake member 80 in the reel hub 42 axial direction within the reel hub 42, a rotation locking position shown in FIG. 14, or a rotation permitting position shown in FIG. 15. Further explanation will now be made with regard to the engaged gear 152 of the reel 40 and the brake gear 154 of the brake member 80; tapered portions 152B, 154B are formed to a portion at the tooth tip side (radial direction outside end) and tooth top side of each of the external teeth 152A configuring the engaged gear 152, and to a portion at the tooth tip side (radial direction inside end) and tooth bottom side of each of the internal teeth 154A configuring the brake gear 154, so as to mutually guide the engaged gear 152 and the brake gear 154 in toward the axial center side. Namely, the tapered portions 152B are formed as angled faces (inflected faces) to portions at the top end on the tooth tip side of each of the external teeth 152A, facing toward the radial direction outside and topside. The tapered portions 154B are formed as angled faces (inflected faces) to portions at the bottom end on the tooth tip side of each of the internal teeth 154A, facing toward the radial direction inside and bottom side. In the present exemplary embodiment, as shown in FIG. 15, tapered portions 152C, 154C are formed respectively at both sides in the circumferential direction of portions of each of the external teeth 152A including the tapered portion 152B, and portions of each of the internal teeth 154A including the tapered portion 154B, in order to guide the other component in the reel circumferential direction (to guide each other to intermesh). It should be noted that configuration may be made in which in the tooth width direction (reel axial direction) of the engaged gear 152 and of the brake gear 154, the range in which the tapered portions 152B, 154B are formed, and the range in which the tapered portions 152C, 154C are formed, differ.

Other parts of the configuration of the recording tape cartridge 150, including non-illustrate portions thereof, are similar to corresponding parts of the configuration of the recording tape cartridge 10.

Consequently, similar effects thereto can also be obtained with the recording tape cartridge 150 according to the second exemplary embodiment by fundamentally the same operation as to that of the recording tape cartridge 10 according to the first exemplary embodiment.

In the recording tape cartridge 150, since the engaged gear 152 is provided at a distance in the radial direction from the circular cylindrical portion 42A (inner circular cylindrical portion 42C) of the reel hub 42, the wall thickness in the radial direction at the bottom side of the circular cylindrical portion 42A can be made thinner. Therefore, molding defects, such as shrinkage, during resin molding, and in particular molding defects to the winding face for the magnetic tape T, can be suppressed (yield improved) in the recording tape cartridge 150.

In addition, in the recording tape cartridge 150, in comparison to the recording tape cartridge 10 in which the engaged gear 54 is formed straddling the bottom plate portion 42B and the inner circular cylindrical portion 42C, a reduction can be achieved in rigidity of the bottom end of the circular cylindrical portion 42A, which having the bottom plate portion 42B, tends to be relatively higher in rigidity with respect to the top end that is the open end of the circular cylindrical portion 42A. Namely, the reel 40 configuring the recording tape cartridge 150 has less difference in rigidity in the radial direction between the top and bottom of the circular cylindrical portion 42A, and the deformation amount of the circular cylindrical portion 42A is substantially uniform at the top and bottom when in a state wound with the magnetic tape T. The winding shape of the magnetic tape T on the reel hub 42 is thereby improved.

In addition, in the recording tape cartridge 150, since the engaged gear 152 and the brake gear 154 are positioned to the radial direction inside with respect to the engaged gear 54 and the brake gear 82, maximum displacement Zmax when dropped can be suppressed to a small amount. Therefore a configuration is achieved in which meshing of the brake gear 154 to the engaged gear 152 disengaging is even less likely due to tilting of the reel 40, for example accompanying dropping the recording tape cartridge 150.

In the recording tape cartridge 10 consideration needs to be made to shrinkage in the gear pitch of the engaged gear 54, due to deformation of the reel hub 42 due to winding tension of the magnetic tape T, when designing the engaged gear 54 of the reel 40. However, in the recording tape cartridge 150, since the engaged gear 152 is provided at a distance from the circular cylindrical portion 42A in the manner described above, the brake gear 154 can displace smoothly between the rotation locking position and the rotation permitting position, independent of deformation of the reel hub 42 due to winding tension.

It should be noted that in each of the above exemplary embodiments examples are given equipped with the engaged gear 54, 152 to which the internal teeth 54A or the external teeth 152A are provided around the entire circumference thereof, and with the brake gear 82, 154 to which the external teeth 82A or the internal teeth 154A are provided around the entire circumference thereof, however the present invention is not limited thereto. For example, configuration may be made in which one or other of the engaged gear 54 or the brake gear 82, or one or other of the engaged gear 152 or the brake gear 154, is provided with the internal teeth 54A or the external teeth 82A in portions around the circumferential direction. In addition there is no limitation to a configuration in which the engaged gear 54, 152, and the brake gear 82, 154 are internal toothed gears or external toothed gears coupled by linking one in the reel radial direction (tooth direction) with the teeth of the other. For example, the engaged gear and the brake gear may be gears respectively shaped with free ends at both sides in the reel radial direction thereof, or the engaged gear and brake gear may be gears shaped with both sides in the reel radial direction coupled to other teeth. It should be noted that gears shaped such as these should also be understood as being internal toothed gears and external toothed gears.

In addition, in each of the exemplary embodiments described above, examples have been given in which the engaged gear 54, 152 are integrally formed to the reel hub 42, however the present invention is not limited thereto. For example, configuration may be made with the engaged gear 54 formed to a ring shaped member that is a separate component from the reel hub 42, and this mounted to the circular cylindrical portion 42A of the reel 40. In such cases the above ring shaped member can be made as a reinforcement ring of high resilience (of metal or fiber reinforced resin etc.) that reinforces the circular cylindrical portion 42A of the reel 40 in the radial direction.

Moreover, in each of the exemplary embodiments described above, configuration was made with the top flange 44 integrally provided to the reel hub 42, however the present invention is not limited thereto. For example, configuration may be made with the bottom flange 46A integrally formed to the reel hub 42, and with the top flange 44 attached to the top end face of the circular cylindrical portion 42A by ultrasonic welding or the like. In such cases, the lock portions 93 of lock members 90 positioned in the restricting position are disposed so as to make contact with a portion of the top flange further to the radial direction inside than the outer peripheral face of the circular cylindrical portion 42A. Consequently, a cylindrical shaped portion may be formed to the top flange that is a separate body to the reel hub 42, for fitting into the circular cylindrical portion 42A.

Furthermore, in each of the exemplary embodiments described above, configuration is made such that the lock members 90 adopt the restricting position or the restriction released position by movement in the reel 40 radial direction, however the present invention is not limited thereto. For example, configuration may be made such that the lock members 90 adopt the restricting position or the restriction released position by movement in a direction intersecting with the reel 40 radial direction, or configuration may be made such that the lock members 90 rotate about specific pivot points so as to adopt the restricting position or the restriction released position.

In the each of the above exemplary embodiments, examples were given in which the opening 20 is provided at the corner portion 12C of the case 12, with the opening 20 opened, or closed off, by a hinge style door 30 and with the leader tape 22 connected to the leading end of the magnetic tape T as a leader member. However, obviously the present invention is not limited by the configuration of the opening in the case 12 used for pulling out the magnetic tape T, by the configuration of the shielding member for opening or closing off the opening, or by the configuration of the leader member.

In addition, while in each of the above exemplary embodiments magnetic tape T was used as recording tape, the present invention is not limited thereto, and obviously any recording tape that falls within the scope of an information recording-reproduction medium of long tape shape capable of recording data and reproducing recorded data may be used, and the recording tape cartridge according to the present invention is applicable to a recoding tape of any recording or reproduction format.

What is claimed is:

1. A recording tape cartridge comprising:
   a reel that has recording tape wound on the outer periphery of a circular cylindrical shaped hub;
   an engaged gear having a plurality of teeth disposed inside the hub around a circular circumference coaxial to the reel hub, with each of the teeth configured with a meshing face substantially parallel to the reel axis;
   a case having a top panel and a bottom panel that face each other, with the reel accommodated between the top panel and the bottom panel and movable along the axial direction;
   a brake member having a brake gear supported so as to be non-rotatable with respect to the case and so as to be meshable, at a meshing face substantially parallel to the reel axial direction, with the meshing face of the engaged gear, the brake member, by displacing with respect to the hub in the reel axial direction, adopting a rotation locking position in which the brake gear is meshed with the engaged gear, and a rotation permitting position in which the meshing is released;
   a guide member that restricts a displacement direction of the brake member with respect to the case to the reel axial direction;
   a first biasing member that biases the reel toward the bottom panel side and generates biasing force to bias the brake member to the rotation locking position;
   a plurality of lock members that are provided around the hub circumferential direction, the plurality of lock members adopting a restricting position that restricts movement of the reel in the axial direction by being inserted between an end portion at the top panel side of the reel and the top panel when the reel is in a state biased to the bottom panel side, and the plurality of lock members adopting a restriction released position that permits movement of the reel with respect to the case in the axial direction by retreating from the restricting position;
   a second biasing member that biases the lock members toward the restricting position; and
   a lock release mechanism that has a pressed portion provided to the plurality of lock members and a pressing portion provided to the brake member, the lock release mechanism moving the plurality of lock members from the restricting position to the restriction released position by the pressing portion pressing the pressed portion accompanying the movement of the brake member from the rotation locking position to the rotation permitting position.

2. The recording tape cartridge of claim 1, wherein a stroke of the brake member along the reel axial direction from the rotation locking position up to where meshing of the brake gear with the engaged gear is released is larger than maximum displacement with respect to the case along the reel axial direction of a region formed with the engaged gear when the reel is tilted a maximum amount with respect to the case in a state with the lock members positioned in the restricting position.

3. The recording tape cartridge of claim 1, further comprising:
- a leader tape that has one end thereof connected to the leading end of the recording tape and is provided, at a portion at the other end thereof within the range of the recording tape width, with a manipulated portion that is manipulated to be pulled out into the drive device when the recording tape is pulled out from an opening of the case;
- a protruding tab that extends to the outside in the leader tape width direction from the portion at the other end of the leader tape; and
- a slot portion provided in the case facing the opening and having a grooved portion into which the protruding tab is inserted so as to be slidable in the direction in which the recording tape is pulled out from the case, and having a stopper portion that closes off the grooved portion at an end portion of the grooved portion toward the inside of the case.

4. The recording tape cartridge of claim 1, wherein the lock members each comprise:
- a body portion that makes slidable contact with the top panel;
- a lock portion that is provided at the radial direction outside end of the body portion and is inserted between the end portion of the reel at the top panel end and the top panel; and
- an engagement portion that projects downward from a portion at the radial direction inside end of the lock portion and that makes face-to-face contact with the inner peripheral face of the circular cylindrical shaped hub when the lock member is positioned in the restricting position.

5. The recording tape cartridge of claim 4, wherein stopper ribs are provided projecting from the top panel of the case, disposed further to the radial direction outside than the radial direction outside end of the lock portions when the lock members are positioned in the restricting position.

6. The recording tape cartridge of claim 1, wherein a retention portion is provided to the top panel of the case, the retention portion retaining the lock portion so as to be movable in the radial direction, the lock member moving in the radial direction while being guided in a state housed in the retention portion.

7. The recording tape cartridge of claim 1, wherein the case is provided with a pair of two guide wall portions extending down from the top panel, and the guide member is inserted between the guide wall portions.

8. The recording tape cartridge of claim 1, wherein the pressed portion is a cam portion projecting down from the radial direction inside end of the lock member, and the pressing portion is an engagement projection that projects from the top face of the brake member.

9. The recording tape cartridge of claim 8, wherein one end of the second biasing member is retained by insertion fitting to an insertion fitting portion projecting inward in the radial direction from the cam portion, and the other end of the second biasing member makes contact with a protrusion portion projecting from a portion at the axial center of the top panel.

10. The recording tape cartridge of claim 8, wherein:
- a tapered face that faces outward in the radial direction and downward is formed at a bottom end of the cam portion;
- a tapered face that faces inward in the radial direction and upward is formed at the top end of the engagement projection; and
- the tapered face of the cam portion and the tapered face of the engagement projection slope at corresponding angles so as to be face-to-face contactable with each other.

11. The recording tape cartridge of claim 10, wherein the sloping angle of the tapered face of the cam portion and the tapered face of the engagement projection is set within the range of from 30° to 60°.

* * * * *